US011503783B2

(12) United States Patent
Craig et al.

(10) Patent No.: US 11,503,783 B2
(45) Date of Patent: Nov. 22, 2022

(54) HYDROPONIC GROWING UNIT

(71) Applicant: OMS INVESTMENTS, INC., Los Angeles, CA (US)

(72) Inventors: Joseph Craig, Marysville, OH (US); Bradley Schultz, Powell, OH (US); Angie Gray, Marysville, OH (US); Whitney Maiden, Marysville, OH (US); Ryan Berger, Columbus, OH (US); Sean Montag, Columbus, OH (US)

(73) Assignee: OMS Investments, Inc., Los Angeles, CA (US)

( * ) Notice: Subject to any disclaimer, the term of this patent is extended or adjusted under 35 U.S.C. 154(b) by 28 days.

(21) Appl. No.: 16/689,636

(22) Filed: Nov. 20, 2019

(65) Prior Publication Data
US 2020/0154659 A1   May 21, 2020

Related U.S. Application Data

(60) Provisional application No. 62/770,213, filed on Nov. 21, 2018.

(51) Int. Cl.
| | |
|---|---|
| *A01G 31/02* | (2006.01) |
| *A01G 7/04* | (2006.01) |
| *A01G 9/02* | (2018.01) |
| *A01G 27/00* | (2006.01) |

(52) U.S. Cl.
CPC .......... *A01G 31/02* (2013.01); *A01G 7/045* (2013.01); *A01G 9/02* (2013.01); *A01G 27/008* (2013.01)

(58) Field of Classification Search
CPC .......................... A01G 31/02; A01G 2031/006
See application file for complete search history.

(56) References Cited

U.S. PATENT DOCUMENTS

| | | | |
|---|---|---|---|
| 1,959,510 A | 5/1934 | Van Waveren |
| 2,740,546 A | 4/1956 | Kowalski |
| 2,930,162 A | 3/1960 | Mulford |
| 3,984,941 A | 10/1976 | Chetta, Jr. |

(Continued)

FOREIGN PATENT DOCUMENTS

| | | | | |
|---|---|---|---|---|
| CN | 201004885 Y | * | 1/2008 | ............ A01G 31/02 |
| CN | 201911183 U | * | 8/2011 | ............ A01G 9/249 |

(Continued)

OTHER PUBLICATIONS

International Search Report and Written Opinion of the International Searching Authority for International Patent App. No. PCT/US2019/062413 dated Feb. 7, 2020; 13 pages.

*Primary Examiner* — Magdalena Topolski
(74) *Attorney, Agent, or Firm* — Ulmer & Berne LLP

(57) ABSTRACT

A hydroponic growing apparatus may include a housing, a water reservoir, and a lighting system. The housing may include a bottom surface and an open top surface. The apparatus may also include a pump, the pump comprising an inlet and an outlet, and a sprayer coupled to the outlet of the pump. Also, the apparatus may include a support structure configured to fit into an open top surface of the housing. The support structure may define a plurality of openings. The apparatus may include at least one cover plate configured to fit over the support structure in the open top surface of the housing.

15 Claims, 23 Drawing Sheets

(56) References Cited

U.S. PATENT DOCUMENTS

| | | | |
|---|---|---|---|
| 4,646,628 | A | 3/1987 | Lederman |
| 5,282,335 | A | 2/1994 | Holtkamp |
| 5,394,647 | A | 3/1995 | Blackford, Jr. |
| 5,502,923 | A | 4/1996 | Bradshaw |
| 6,038,812 | A | 3/2000 | Belokin et al. |
| 6,901,700 | B2 | 6/2005 | Trabka |
| 7,069,691 | B2 | 7/2006 | Brooke et al. |
| 8,261,486 | B2 * | 9/2012 | Bissonnette ......... A01G 27/003 47/59 R |
| 8,667,734 | B2 | 3/2014 | Johnson et al. |
| 8,998,473 | B1 | 4/2015 | Anderson |
| 9,456,560 | B1 | 10/2016 | MacKichan et al. |
| 9,872,095 | B2 | 1/2018 | Lee |
| 10,149,442 | B2 | 12/2018 | Hohmann |
| D850,323 | S | 6/2019 | Kaminski et al. |
| 10,757,875 | B2 * | 9/2020 | Loiske ................. A01G 31/02 |
| 2005/0229487 | A1 | 10/2005 | Whisenant |
| 2005/0274073 | A1 | 12/2005 | Brooke et al. |
| 2006/0288640 | A1 | 12/2006 | Leithold |
| 2007/0271841 | A1 | 11/2007 | Bissonnette et al. |
| 2008/0032806 | A1 | 2/2008 | Henry et al. |
| 2008/0282610 | A1 | 11/2008 | Bissonnette et al. |
| 2008/0313960 | A1 | 12/2008 | Norvitch |
| 2009/0126269 | A1 | 5/2009 | Wilson et al. |
| 2009/0151248 | A1 * | 6/2009 | Bissonnette ........... A01G 31/02 47/59 S |
| 2011/0056132 | A1 | 3/2011 | Gardner |
| 2011/0232190 | A1 | 9/2011 | Pindus et al. |
| 2013/0205663 | A1 * | 8/2013 | Topping ................. A01G 9/20 47/66.6 |
| 2013/0255152 | A1 | 10/2013 | Johnson et al. |
| 2014/0259920 | A1 * | 9/2014 | Wilson ................. A01G 22/00 47/62 R |
| 2015/0156973 | A1 | 6/2015 | Prinster et al. |
| 2015/0208598 | A1 | 7/2015 | Kern |
| 2015/0351325 | A1 * | 12/2015 | Shelor ................... H05B 45/20 47/58.1 LS |
| 2018/0092312 | A1 | 4/2018 | Goodwin et al. |
| 2018/0368345 | A1 * | 12/2018 | Kariv .................... A01G 31/02 |
| 2018/0368346 | A1 | 12/2018 | Watson |
| 2020/0084983 | A1 * | 3/2020 | Liang ................ B01D 53/0407 |
| 2021/0153446 | A1 * | 5/2021 | Goodwin ............. A01G 31/02 |

FOREIGN PATENT DOCUMENTS

| | | | | |
|---|---|---|---|---|
| CN | 201919446 U | * | 8/2011 | ............ A01G 31/02 |
| CN | 105340718 A | * | 2/2016 | |
| CN | 107343470 A | | 11/2017 | |
| CN | 107343470 A | * | 11/2017 | |
| CN | 107926340 A | * | 4/2018 | |
| CN | 107950375 A | * | 4/2018 | ............ A01G 31/02 |
| CN | 108935058 A | * | 12/2018 | |
| DE | 202014101488 U1 | | 7/2014 | |
| EP | 2030503 A1 | * | 3/2009 | ............ A01G 31/02 |
| GB | 2576761 A | * | 3/2020 | ............ A01G 31/02 |
| JP | 2012147765 A | * | 8/2012 | ............ A01G 31/02 |
| KR | 20100013038 U | * | 12/2010 | |
| KR | 101040580 B1 | | 6/2011 | |
| KR | 101211246 B1 | | 12/2012 | |
| KR | 101251203 B1 | * | 4/2013 | ............ A01G 7/045 |
| KR | 102340090 B1 | * | 12/2021 | |
| WO | WO-2014083532 A1 | * | 6/2014 | ............ A01G 7/045 |

* cited by examiner

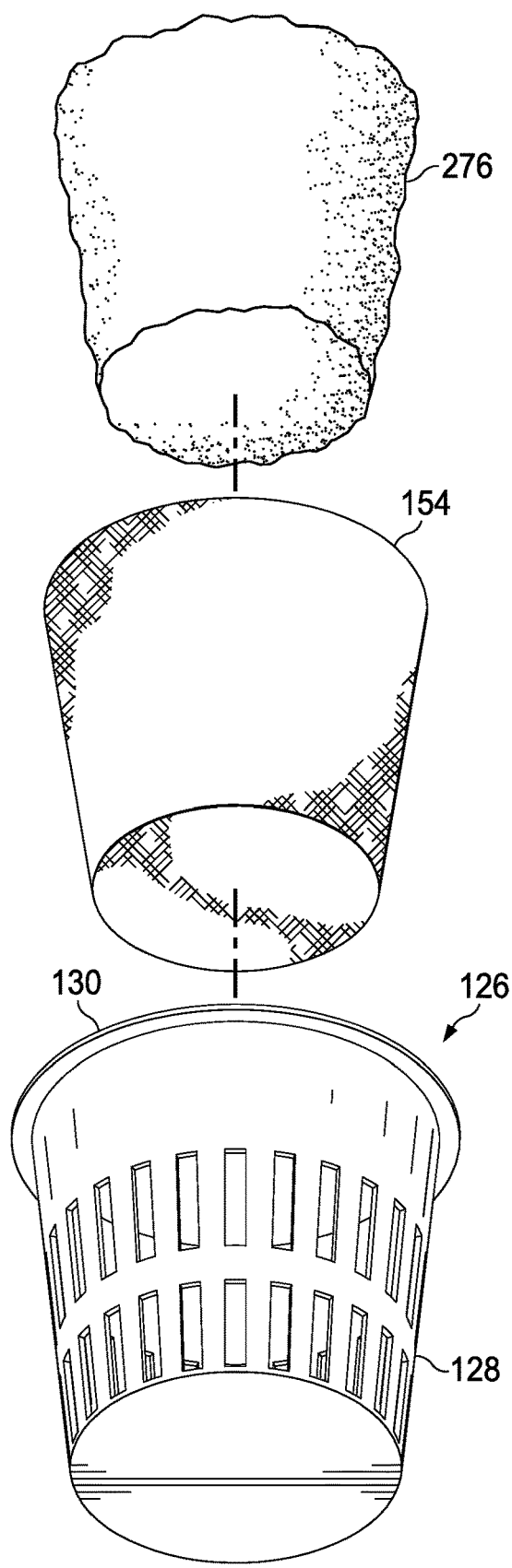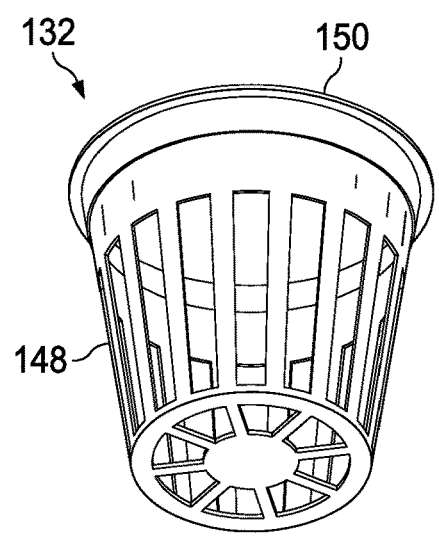
FIG. 15
FIG. 16

HYDROPONIC GROWING UNIT

CROSS-REFERENCE TO RELATED APPLICATIONS

This application claims the priority benefit of U.S. Provisional Patent App. No. 62/770,213 filed Nov. 21, 2018, which is incorporated herein by reference in its entirety.

TECHNICAL FIELD

The present disclosure relates generally to hydroponic growing units.

BACKGROUND

Conventional hydroponic systems come in many forms and are often a trough-like shape, where a row or multiple rows of plants are grown. The pumps can be external to the water trough or water reservoir in these types of systems. Conventional hydroponic systems have pumps that may be external to the unit, which has a decreased flow rate as compared to pumps that can be submersed in water or other liquid. A low flow rate results in salt crust build-up on the plants grown in a hydroponic system. Improvements to hydroponic growing units may be made to overcome deficiencies in existing hydroponic growers.

SUMMARY

According to one embodiment, a hydroponic growing apparatus may include a housing, a water reservoir, and a lighting system. The housing may include a bottom surface and an open top surface, and the water reservoir may comprise at least a portion of the volume between the bottom and top surfaces of the housing. The apparatus may also include a pump positioned at a bottom portion of the water reservoir, the pump comprising an inlet and an outlet, and a sprayer coupled to the outlet of the pump. Also, the apparatus may include a support structure configured to fit into the open top surface of the housing and defining a plurality of openings. The apparatus may include at least one cover plate configured to fit over the support structure in the open top surface of the housing. The at least one cover plate comprises a plurality of cut-outs corresponding to the plurality of openings of the support structure.

According to another embodiment, a method of hydroponically growing a plant includes positioning a plant rooted in a growing material in a net cup and placing the net cup in a hydroponic growing apparatus.

According to another embodiment, a kit includes a hydroponic growing apparatus, one or more net cups of a first size, and one or more net cups of a second size, the second size being different from the first size. The kit may also include one or more adapters and one or more cylindrical plugs sized to fit in the one or more net cups of the second size.

According to another embodiment, a kit includes a hydroponic growing apparatus and a nutrient composition.

BRIEF DESCRIPTION OF THE DRAWINGS

The present disclosure will be more readily understood from a detailed description of some example embodiments taken in conjunction with the following figures.

FIG. 15 is an exploded view of a net cup, liner, and growing media of the hydroponic growing unit of FIG. 1;

FIG. 16 is a perspective view of another net cup of the hydroponic growing unit of FIG. 1;

DETAILED DESCRIPTION

The following description is intended to convey a thorough understanding of the embodiments by providing various embodiments and details involving a hydroponic unit. It is understood, however, that the disclosure is not limited to these specific embodiments and details, which are illustrative only. It is further understood that one possessing ordinary skill in the art, in light of known devices, systems, and methods, would appreciate the use of the disclosure for its intended purposes and benefits in any number of alternative embodiments. As described further below, the hydroponic units described herein improve the ease with which a user grows plants.

Figure 1:
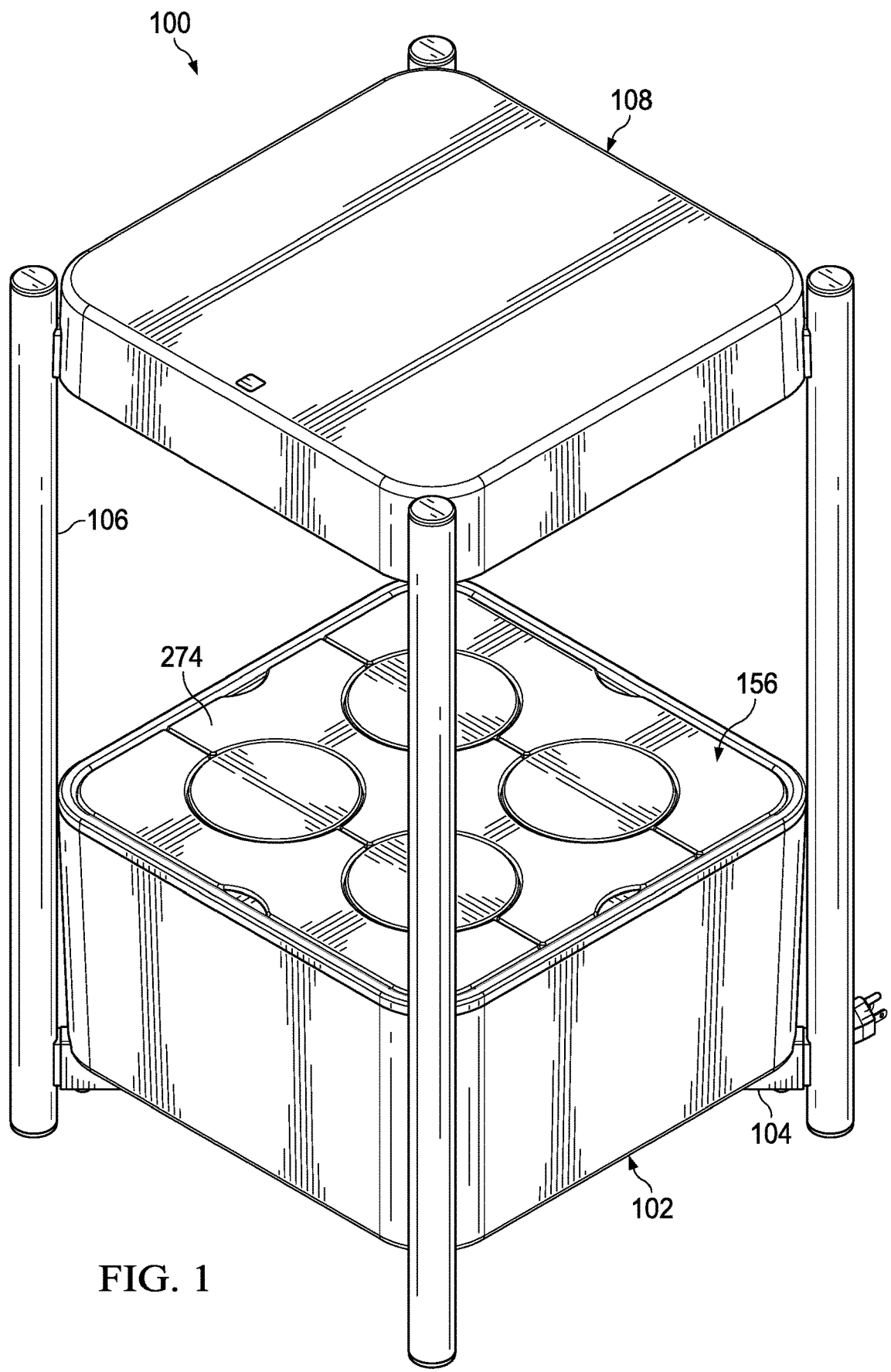
FIG. 1 is a top isometric view of an embodiment of a hydroponic growing unit.
Figure 2:
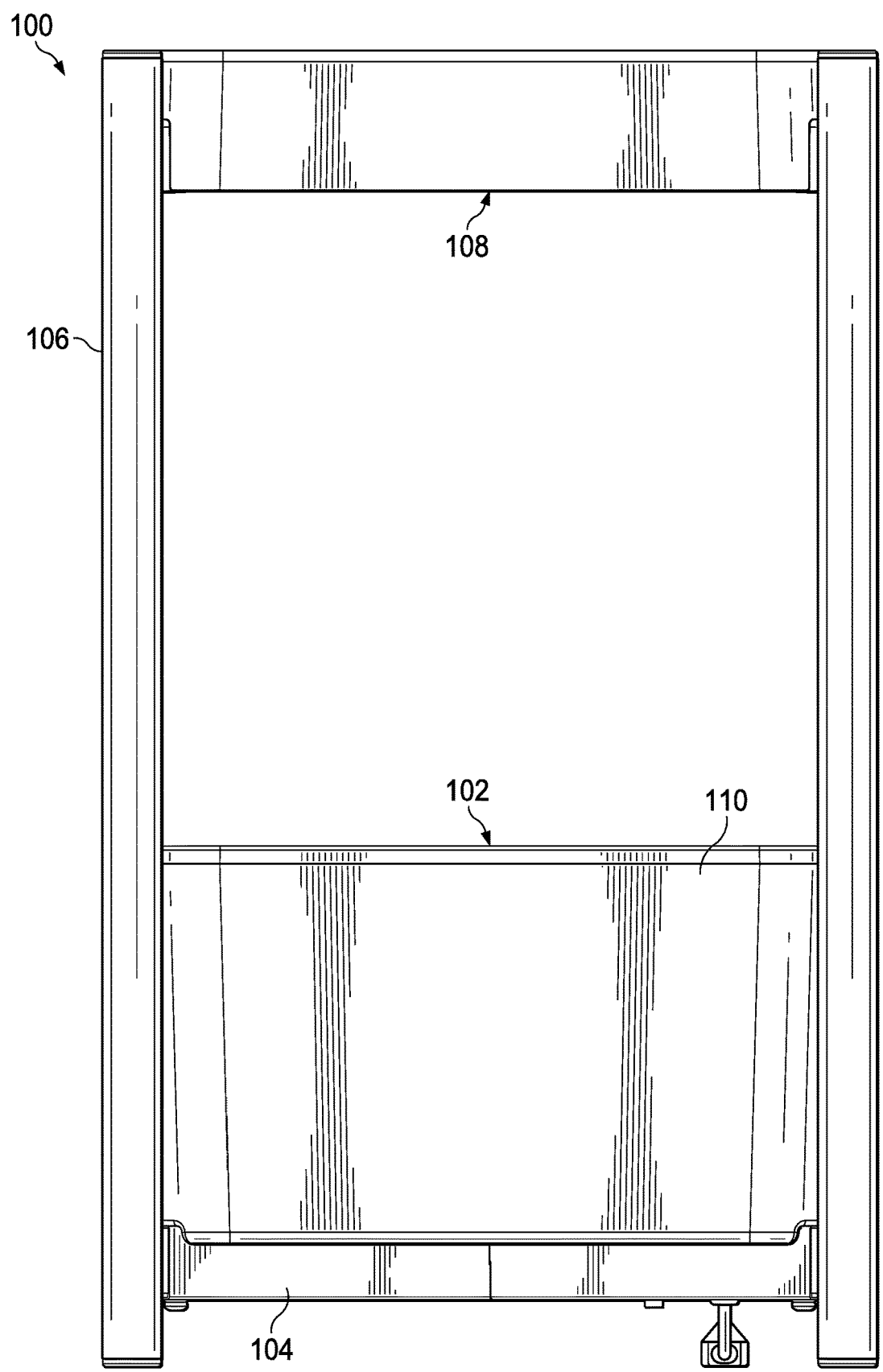
FIG. 2 is a front elevational view of the hydroponic growing unit of FIG. 1.
Figure 3:
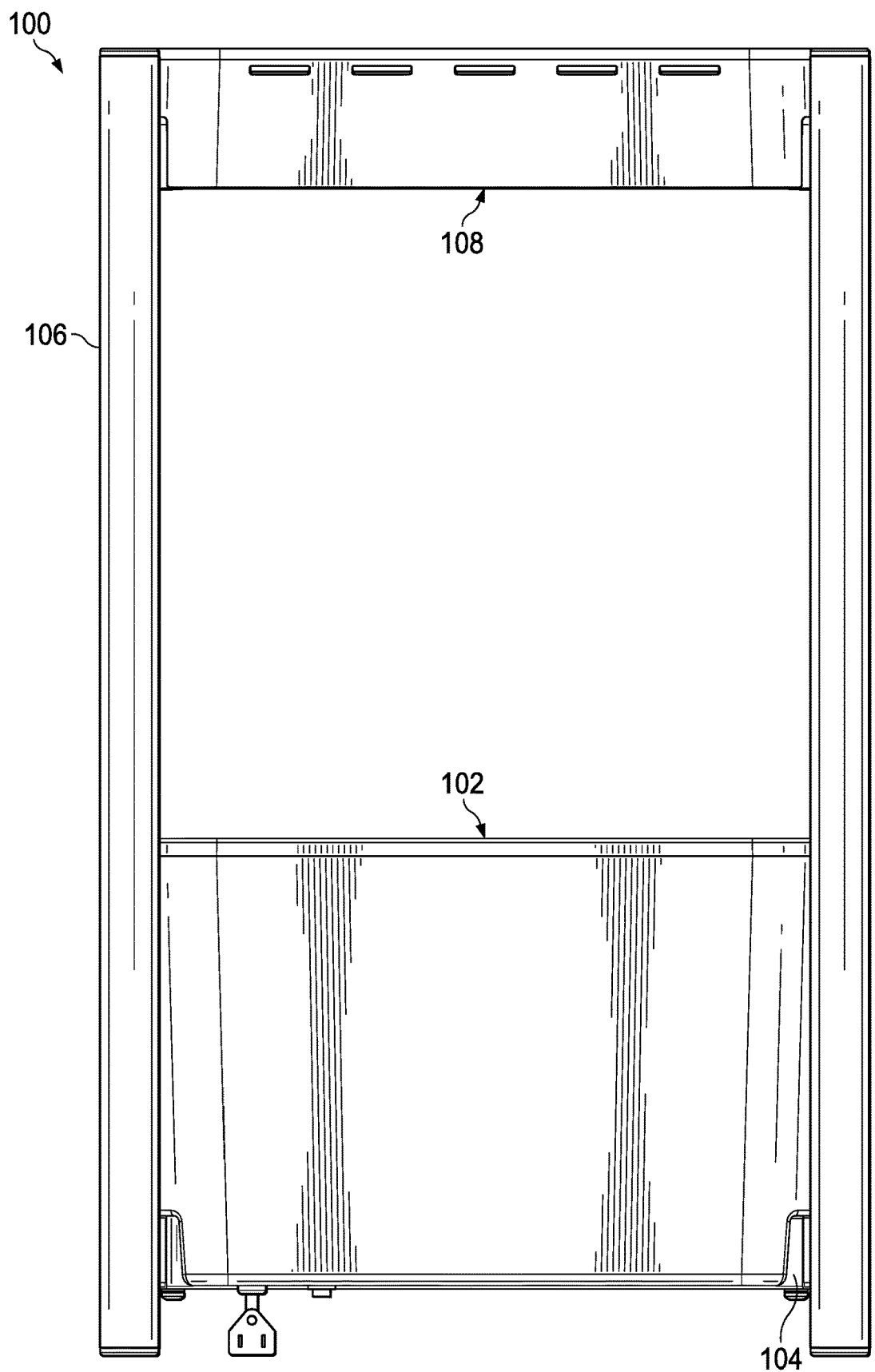
FIG. 3 is a back elevational view of the hydroponic growing unit of FIG. 1.
Figure 4:
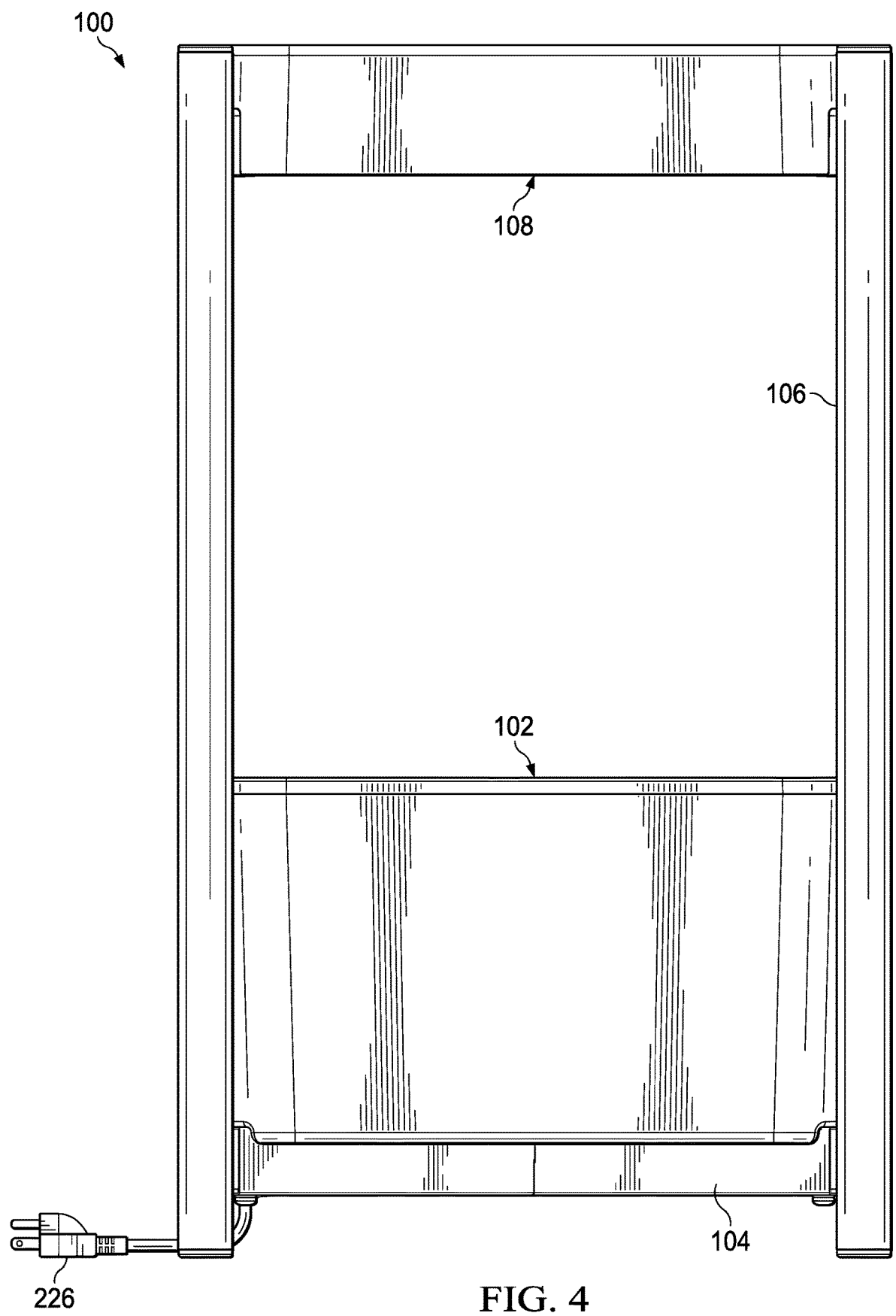
FIG. 4 is a side elevational view of the hydroponic growing unit of FIG. 1.
Figure 5:
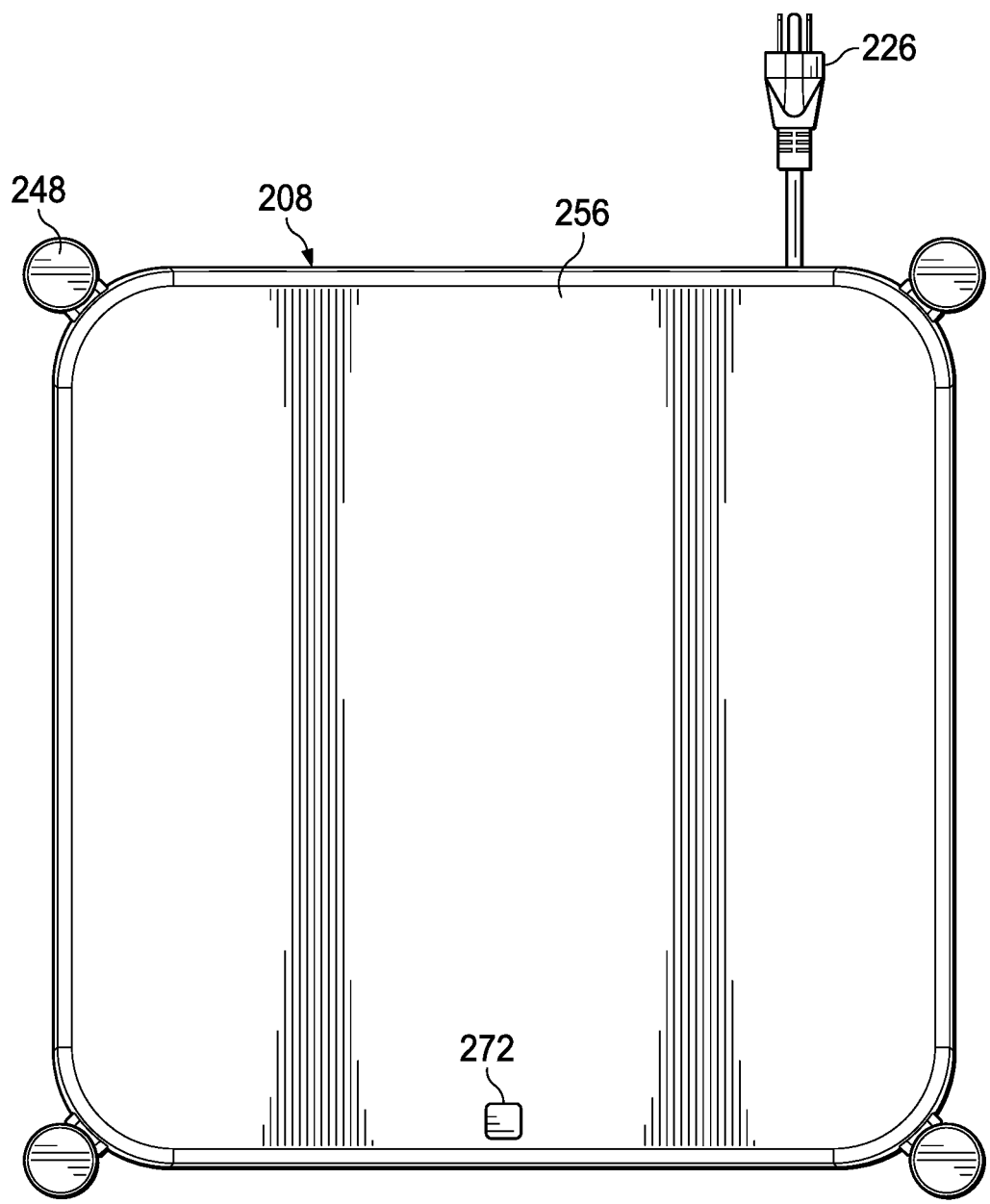
FIG. 5 is a top planar view of the hydroponic growing unit of FIG. 1.
Figure 6:
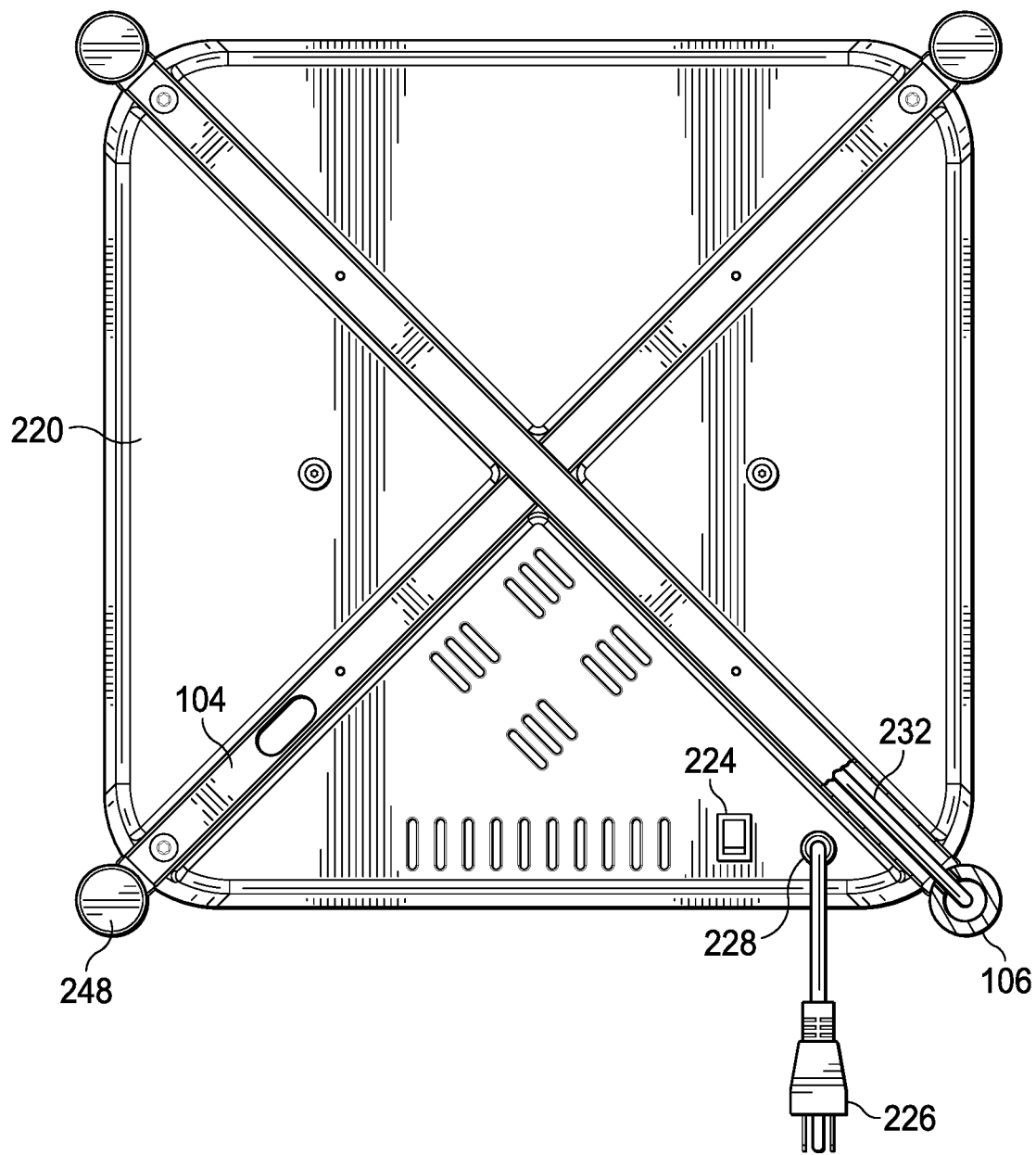
FIG. 6 is a bottom planar view of the hydroponic growing unit of FIG. 1.
Figure 7:
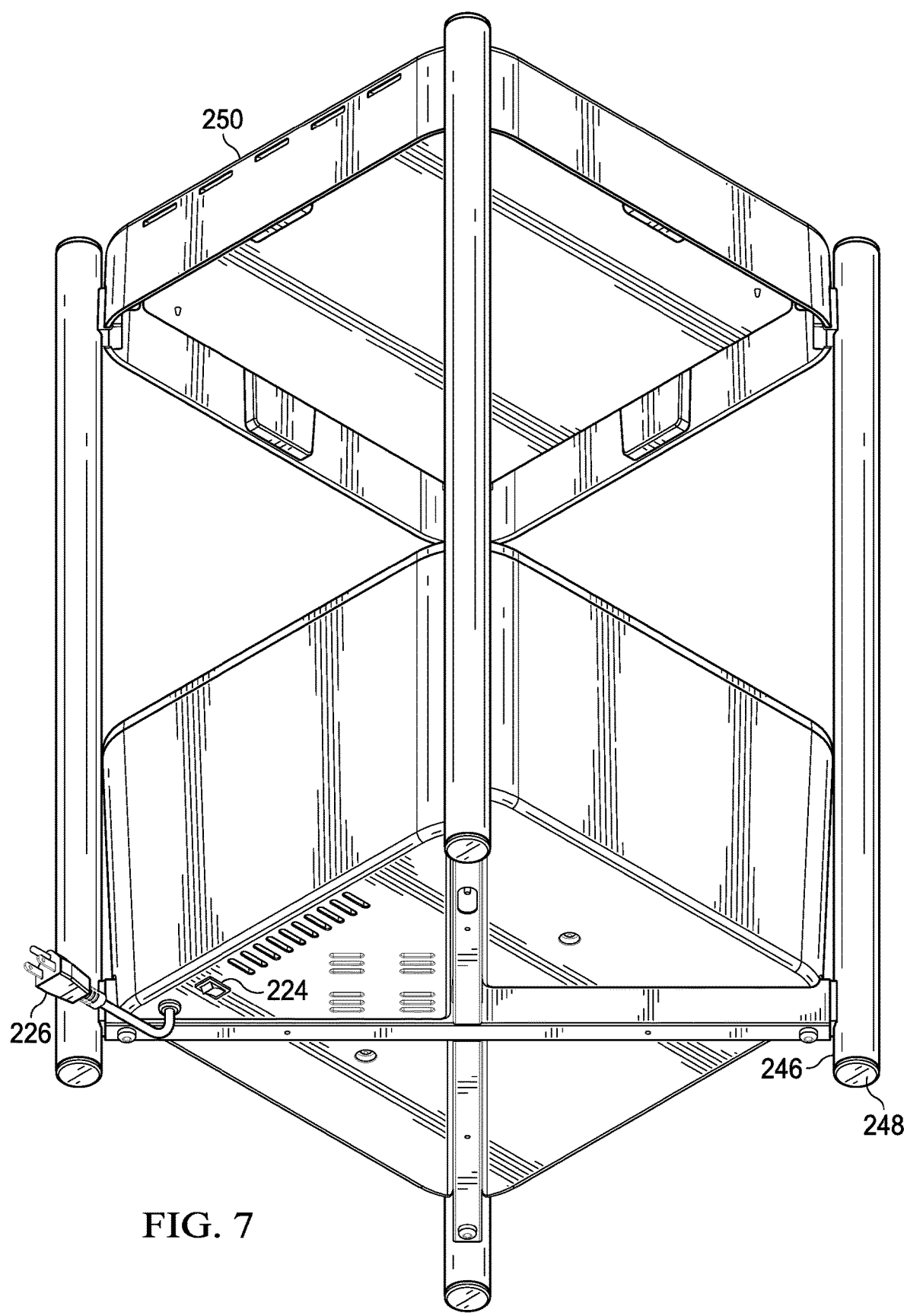
FIG. 7 is a bottom isometric view of the hydroponic growing unit of FIG. 1.
Figure 8:
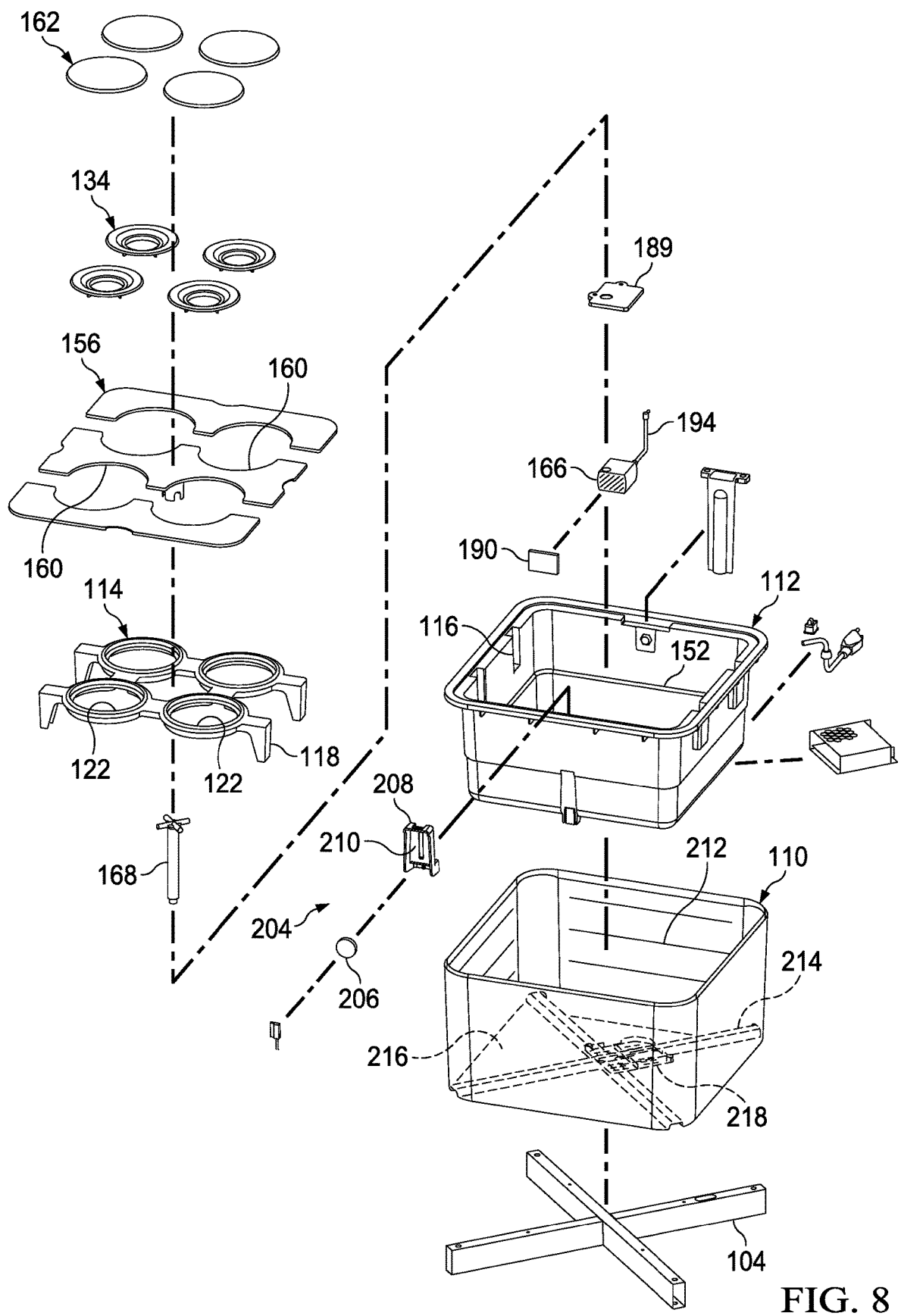
FIG. 8 is an exploded view of a growth unit and support of the hydroponic growing unit of FIG. 1.
Figure 9:
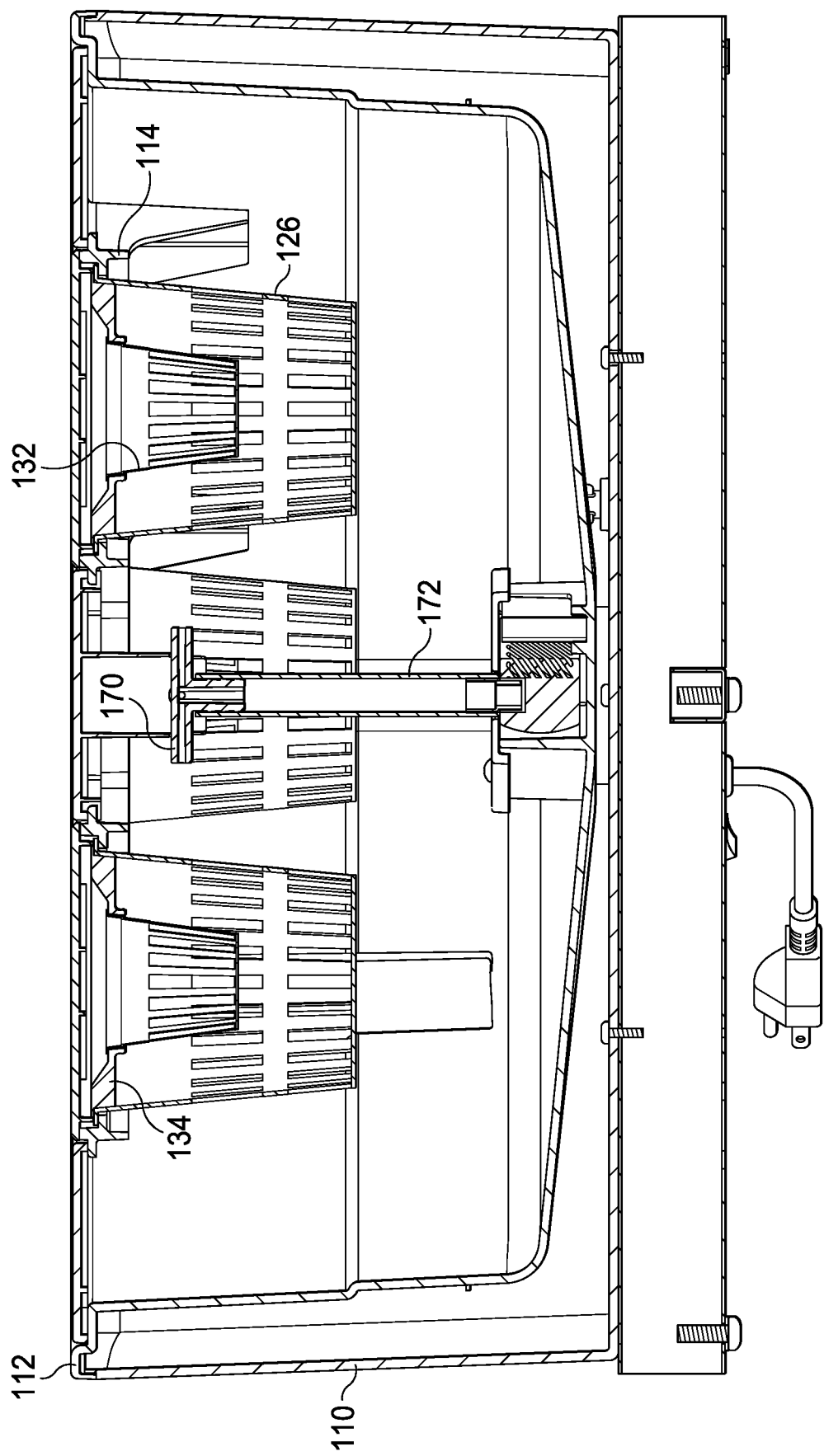
FIG. 9 is a cross-sectional view of the hydroponic growing unit of FIG. 1.
Figure 10:
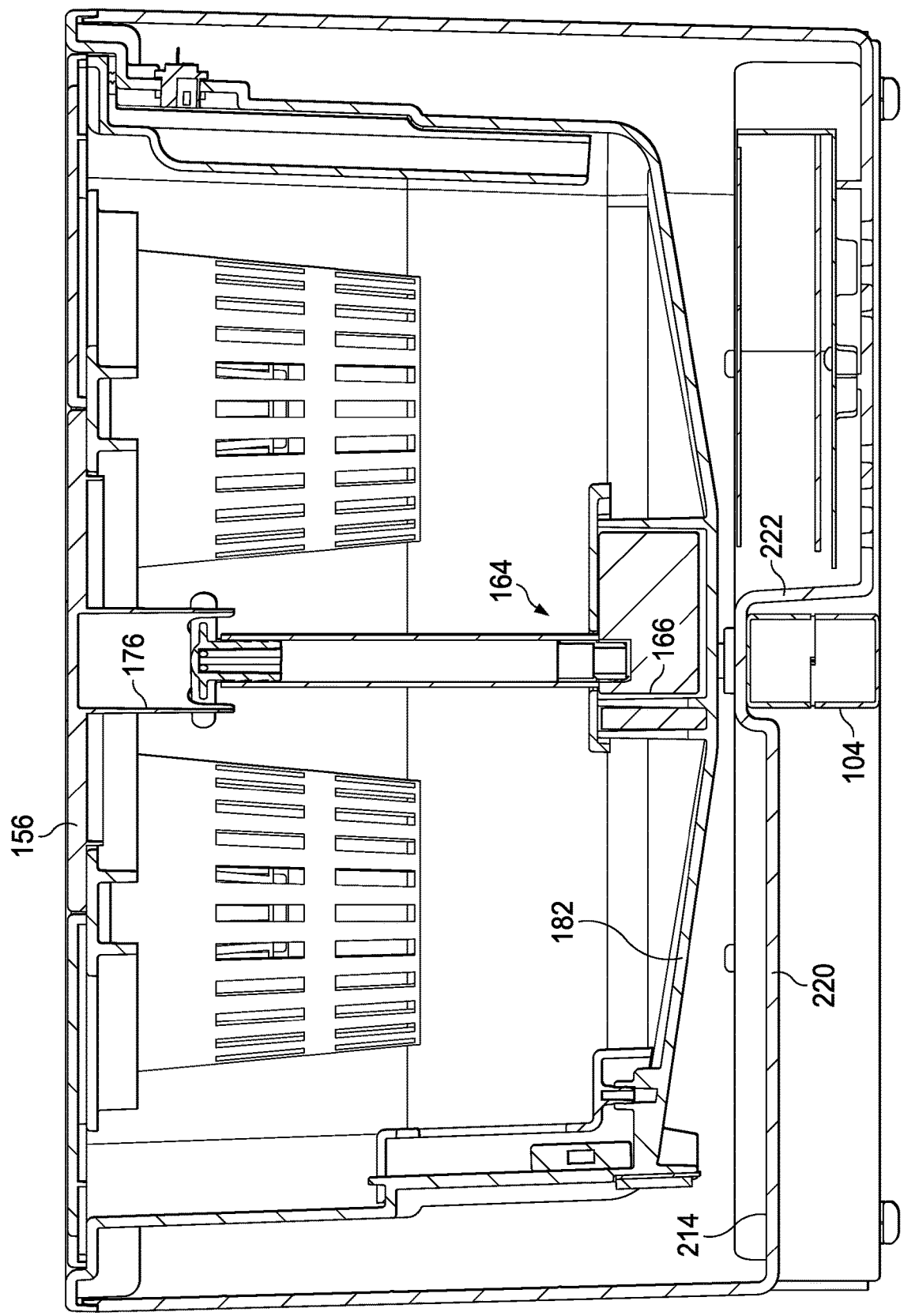
FIG. 10 is a cross-sectional view of the hydroponic growing unit of FIG. 1.
Figure 11:
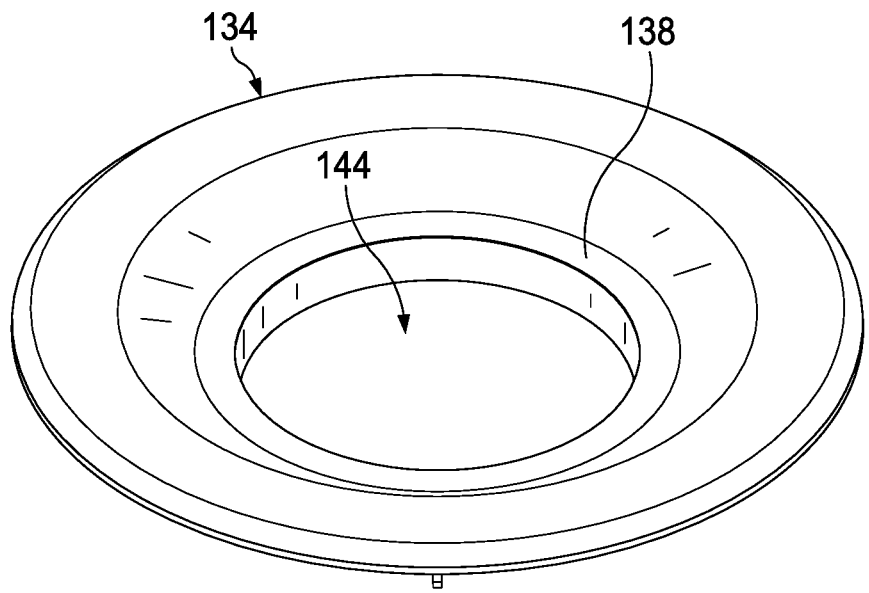
FIG. 11 is a perspective view of an adapter of the hydroponic growing unit of FIG. 1.
Figure 12:
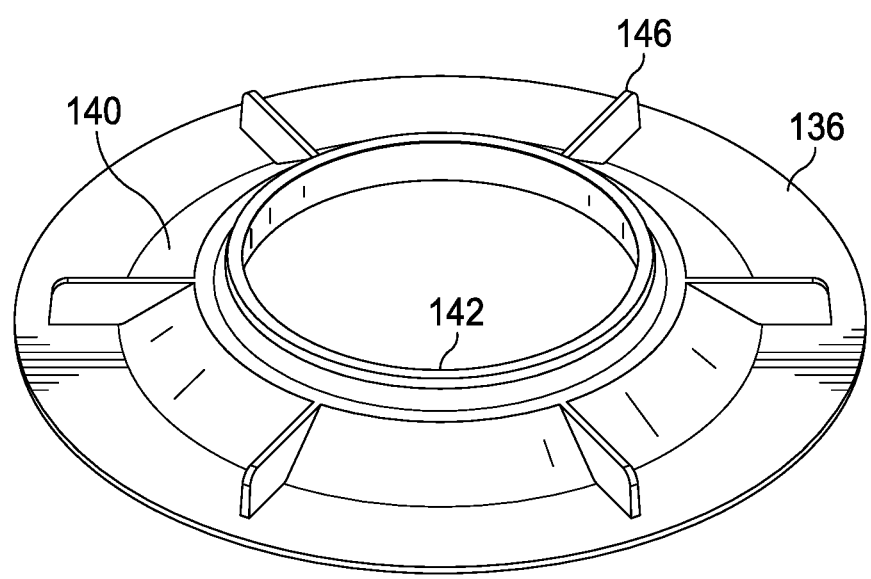
FIG. 12 is a perspective view of the underside of the adapter of FIG. 11.
Figure 13:
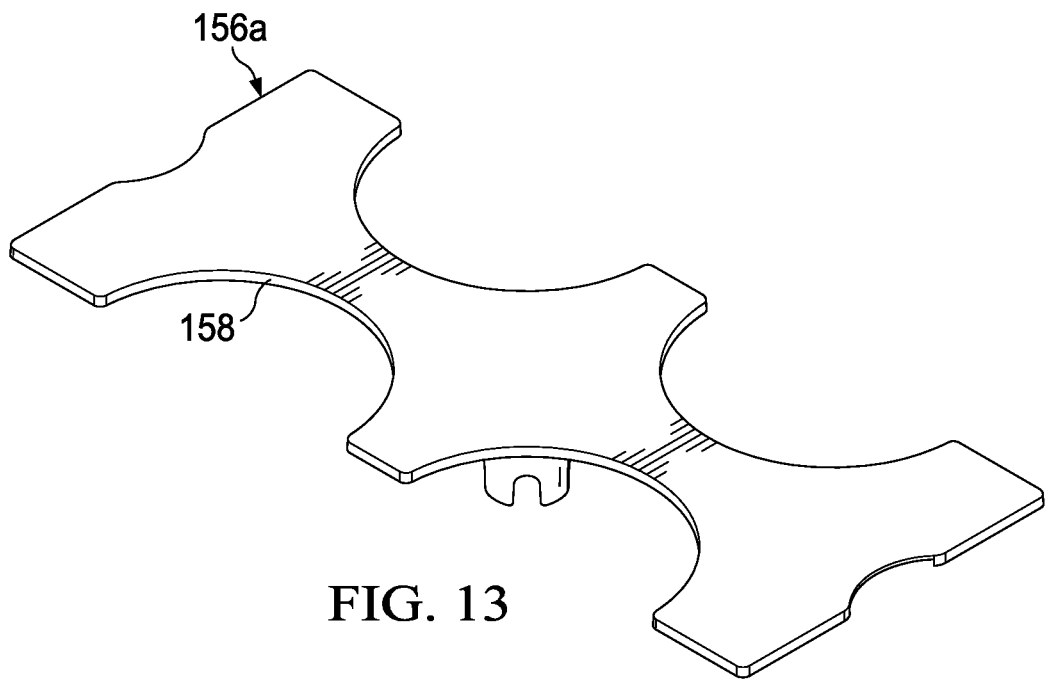
FIG. 13 is a perspective view of a cover plate of the hydroponic growing unit of FIG. 1.
Figure 14:
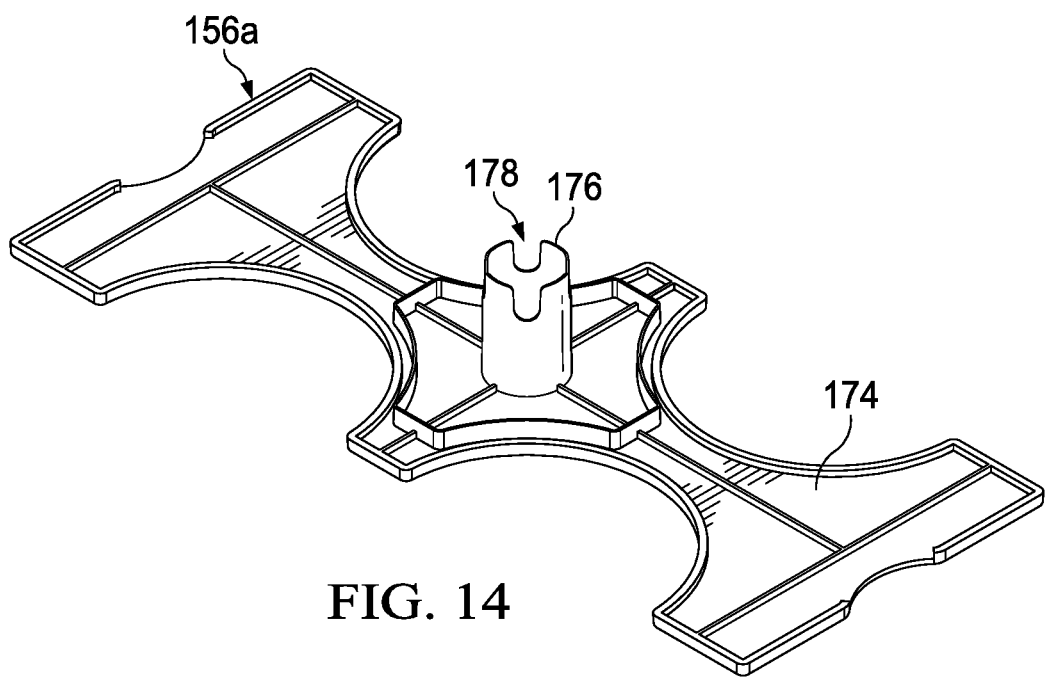
FIG. 14 is a perspective view of the underside of the cover plate of FIG. 13.
Figure 17:
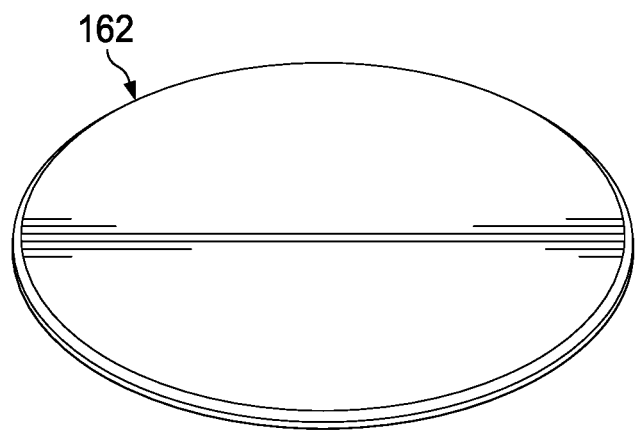
FIG. 17 is a perspective view of a lid of the hydroponic growing unit of FIG. 1.
Figure 18:
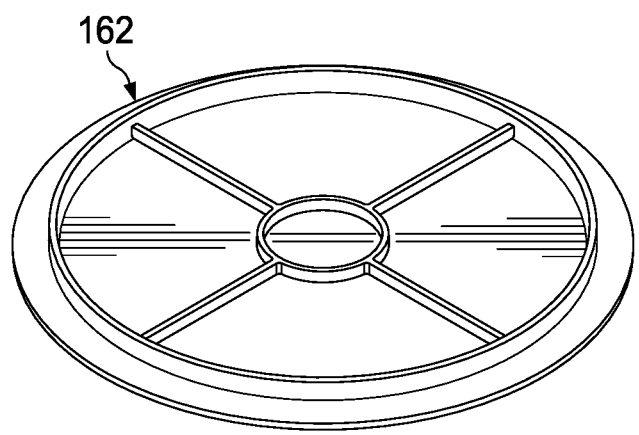
FIG. 18 is a perspective view of the underside of the lid of FIG. 17.
Figure 19:
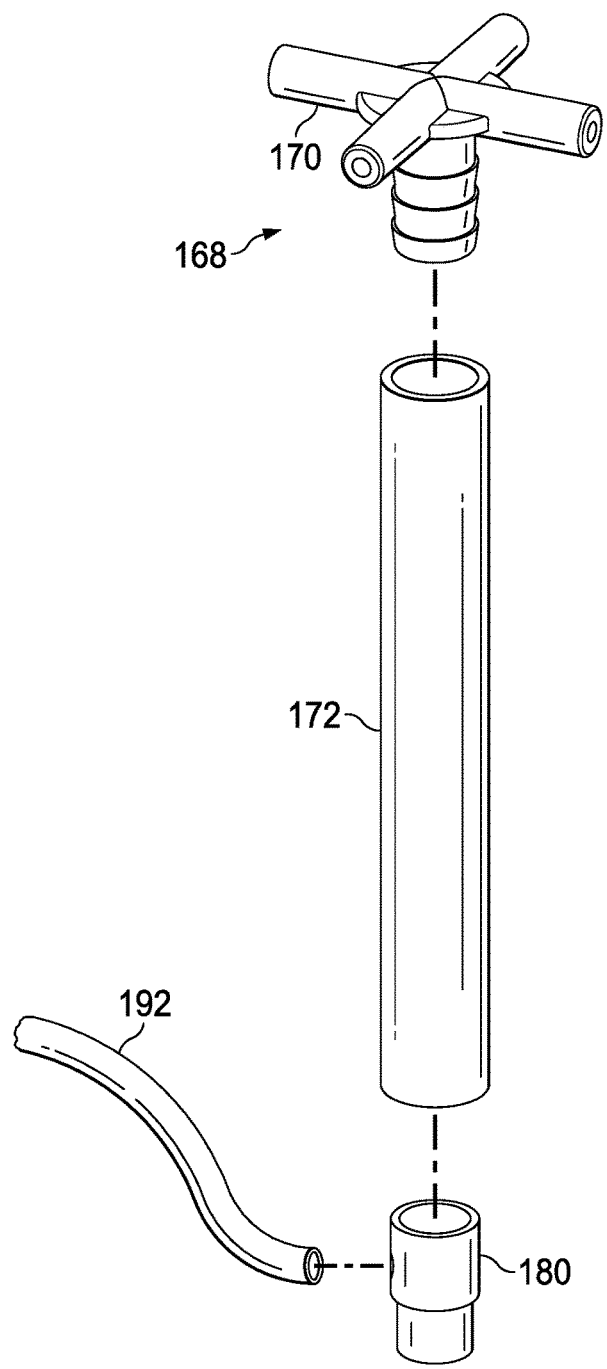
FIG. 19 is an exploded view of a sprayer of the hydroponic growing unit of FIG. 1.
Figure 20:
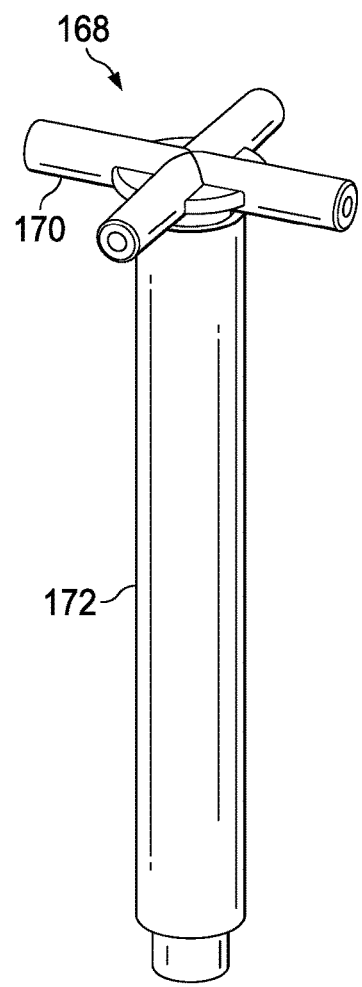
FIG. 20 is a perspective view of the sprayer of FIG. 19.
Figure 21:
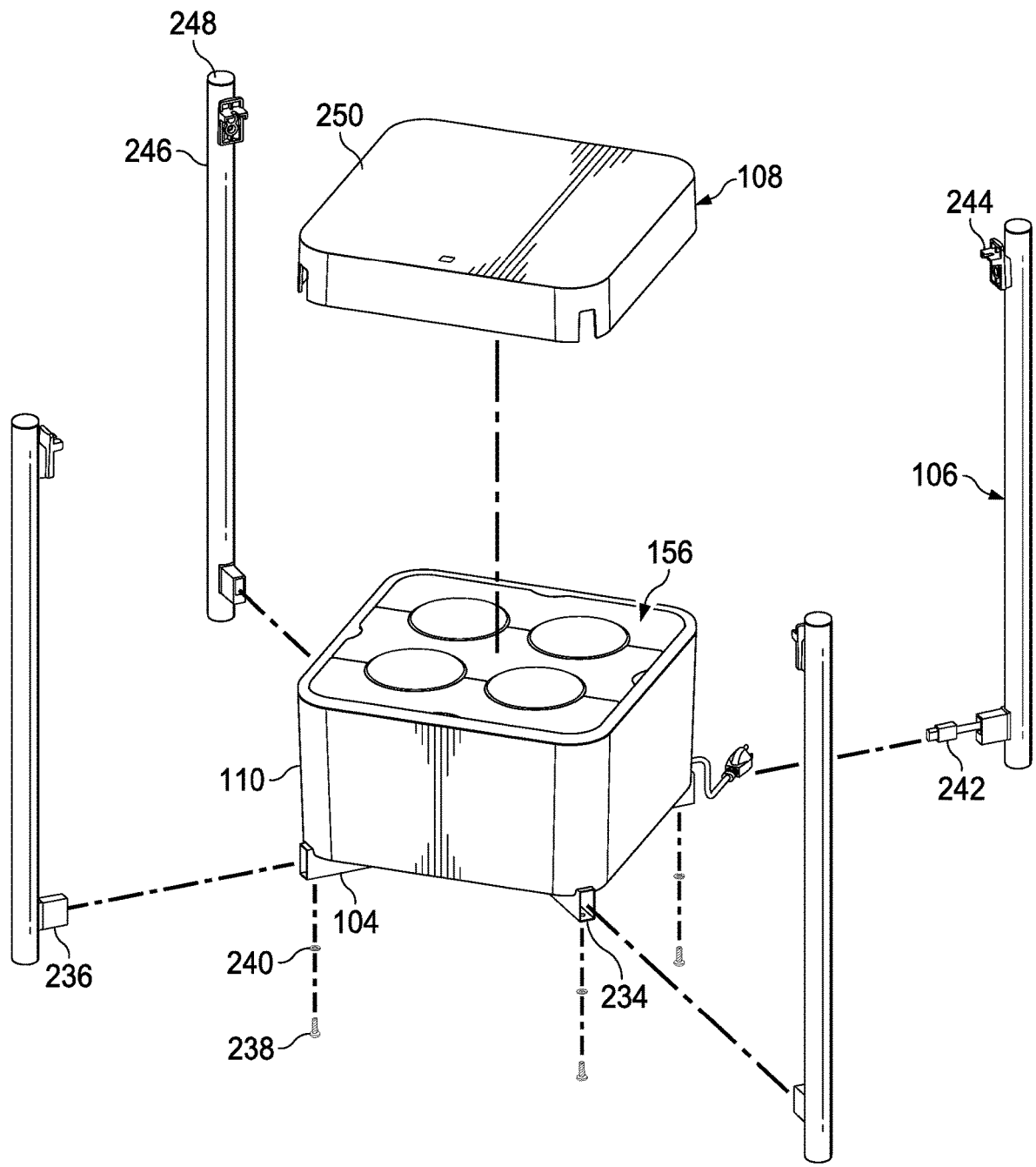
FIG. 21 is an exploded view of the hydroponic growing unit of FIG. 1.
Figure 22:
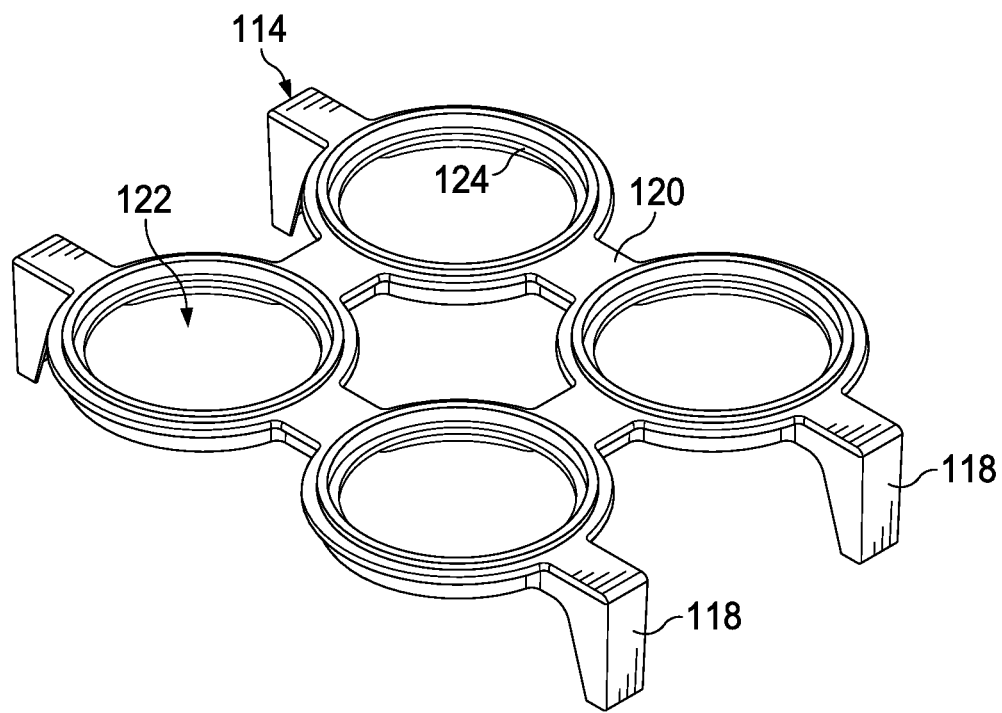
FIG. 22 is a perspective view of a platform of the hydroponic growing unit of FIG. 1.
Figure 23:
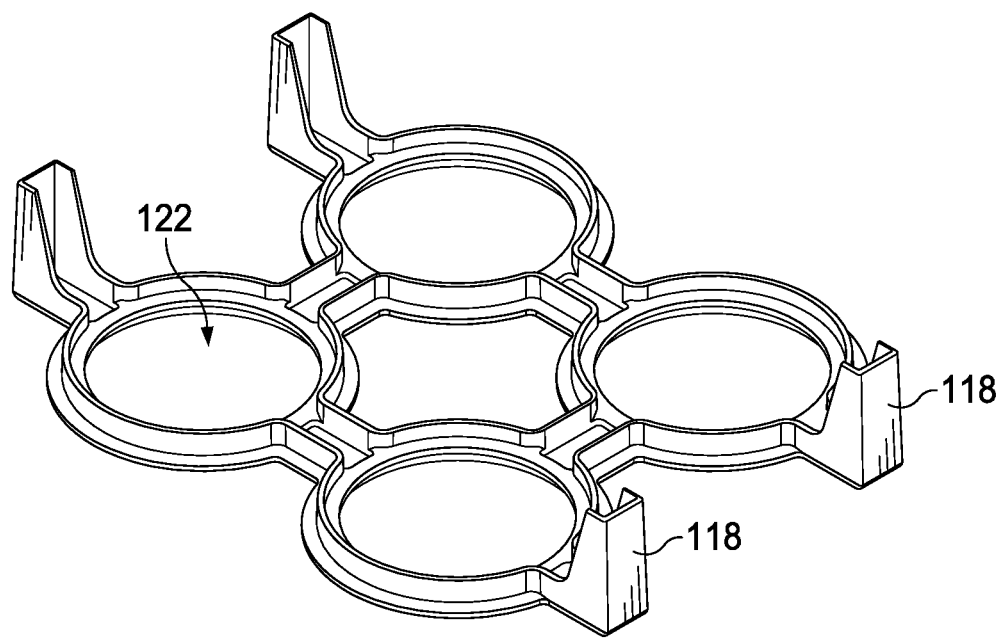
FIG. 23 is a perspective view of the platform of FIG. 22.
Figure 24:
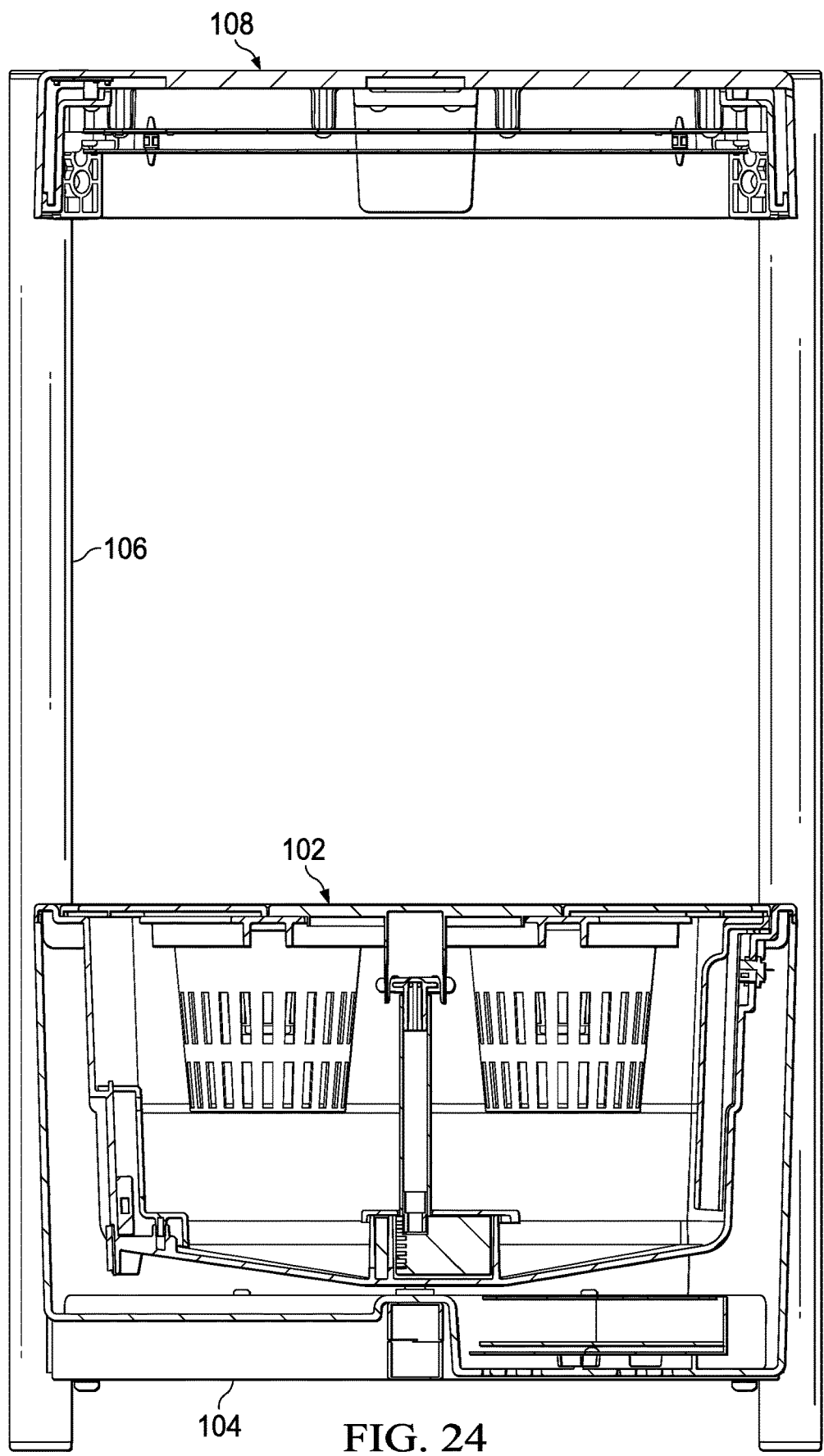
FIG. 24 is a cross-sectional view of the hydroponic growing unit of FIG. 1.
Figure 25:
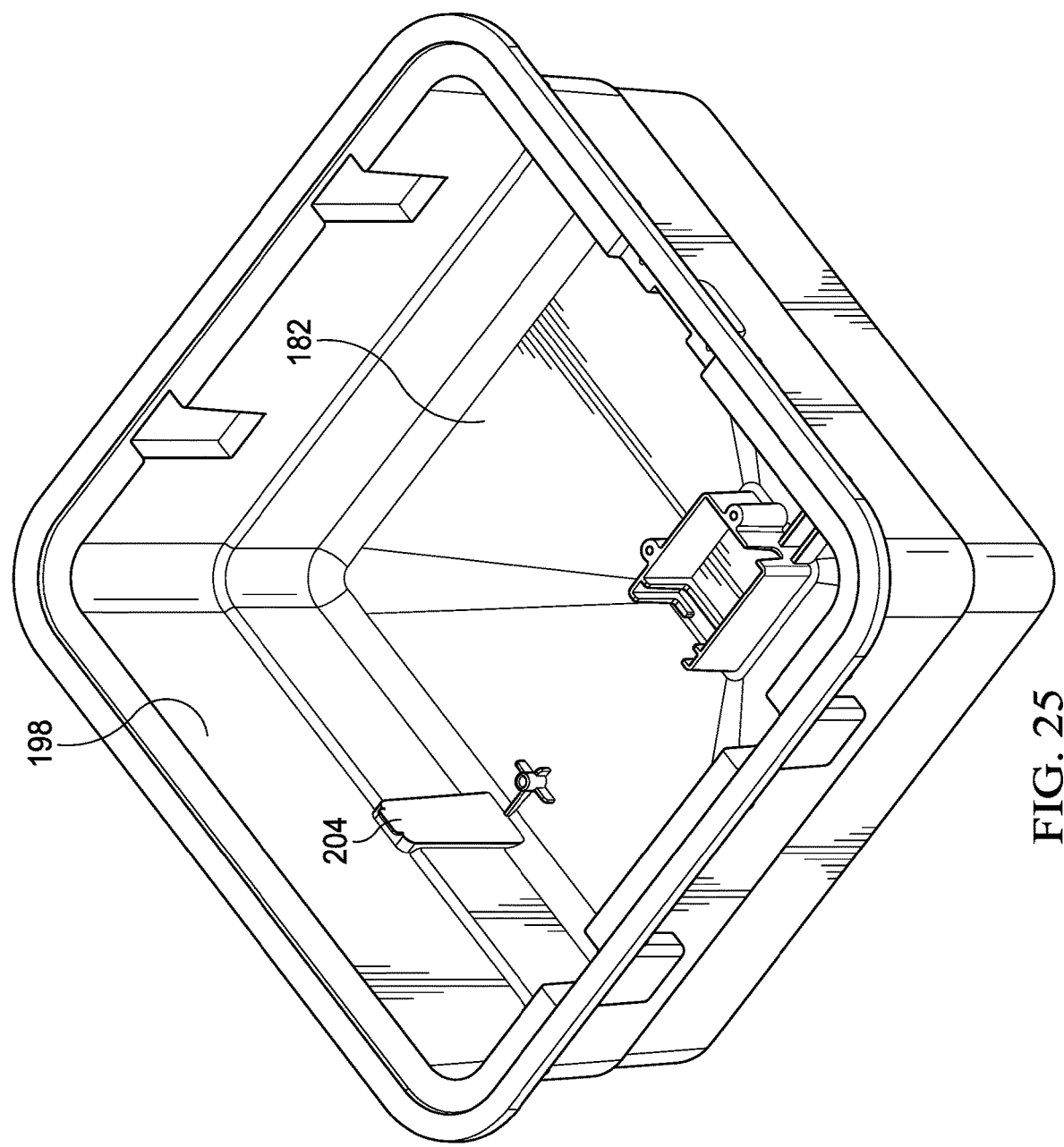
FIG. 25 is a perspective view of a water reservoir of the hydroponic growing unit of FIG. 1.
Figure 26:
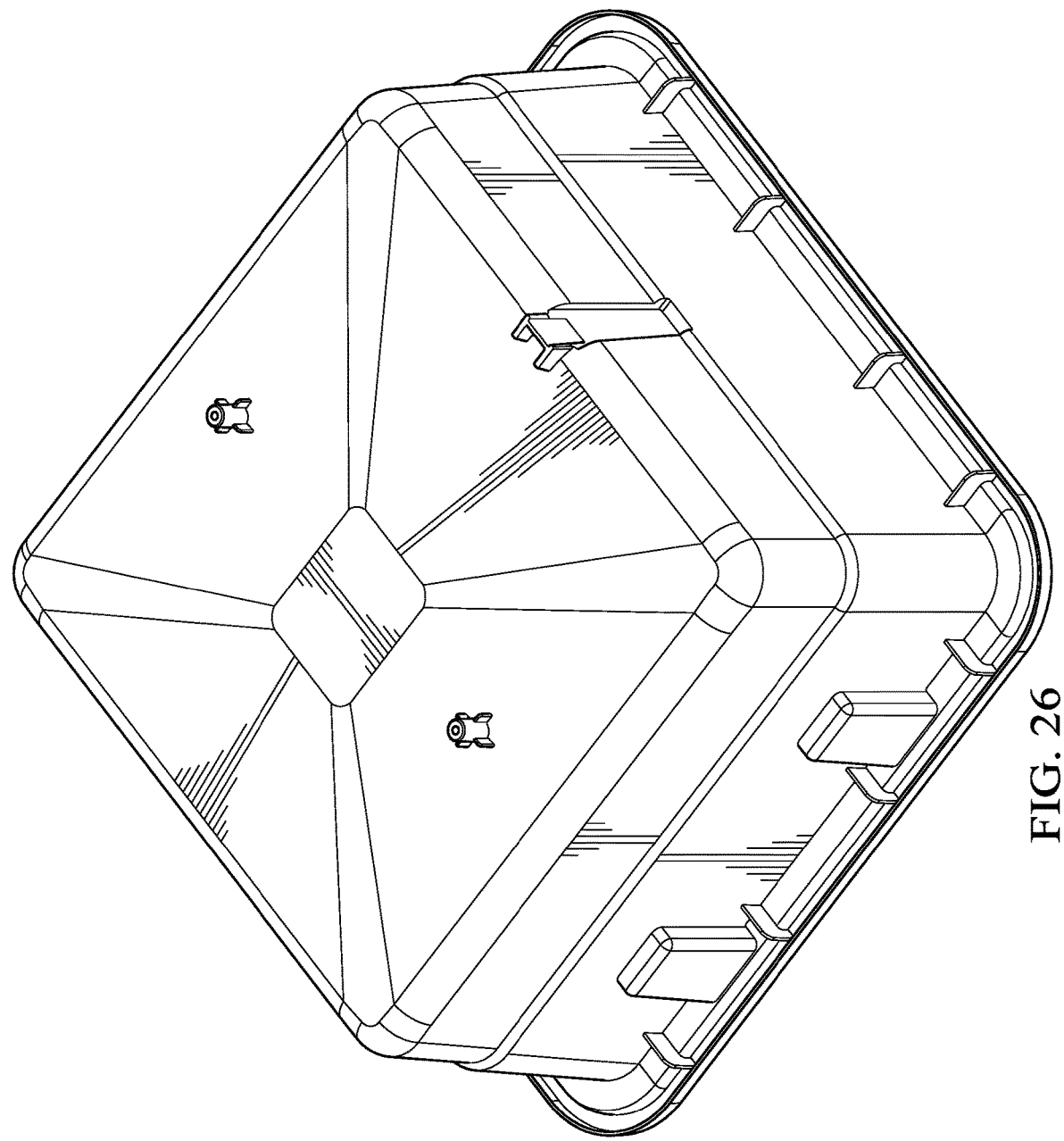
FIG. 26 is a perspective view of the underside of the water reservoir of FIG. 25.
Figure 27:
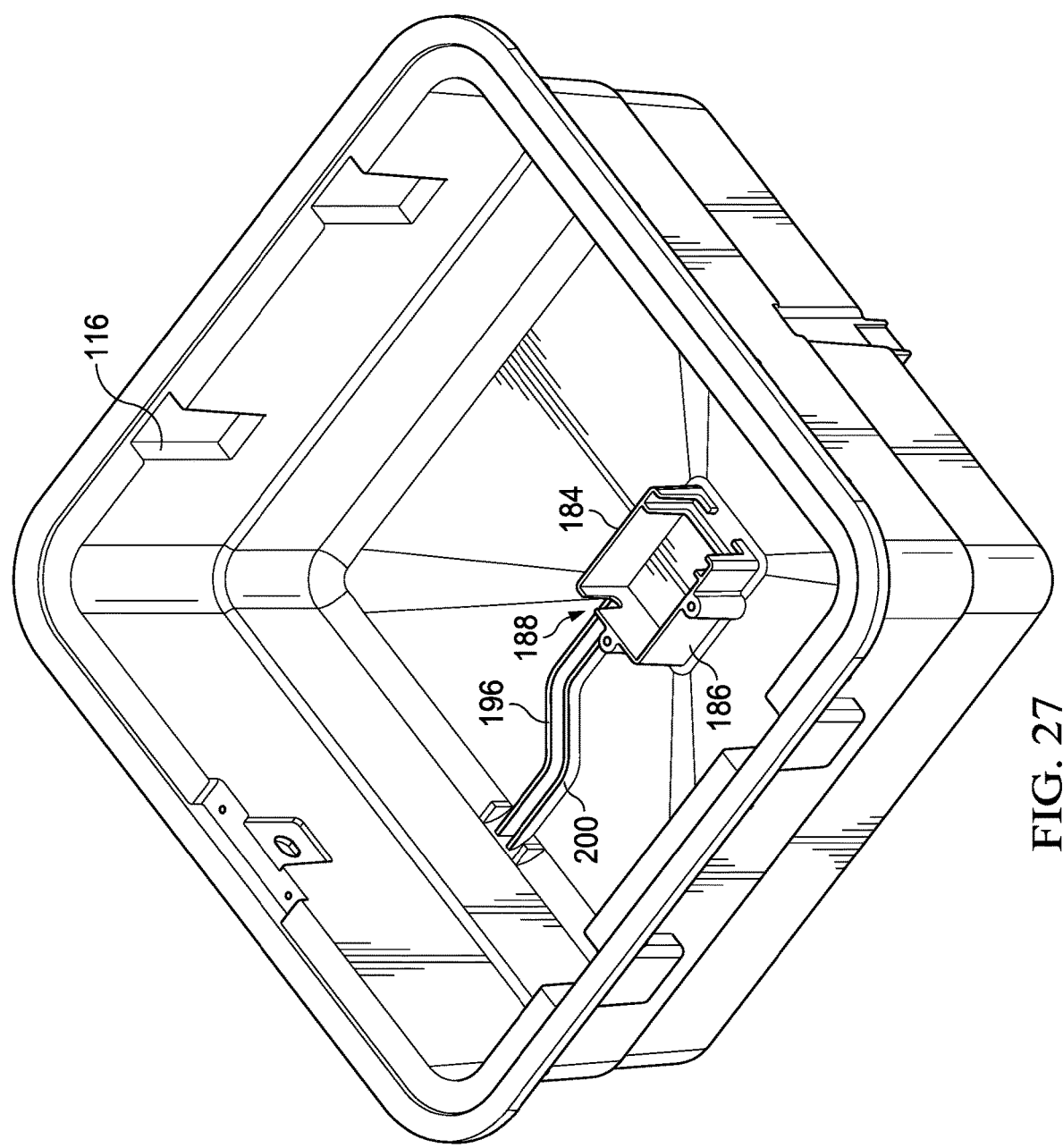
FIG. 27 is a perspective view of a water reservoir of the hydroponic growing unit of FIG. 1 rotated from the view of FIG. 25.
Figure 28:
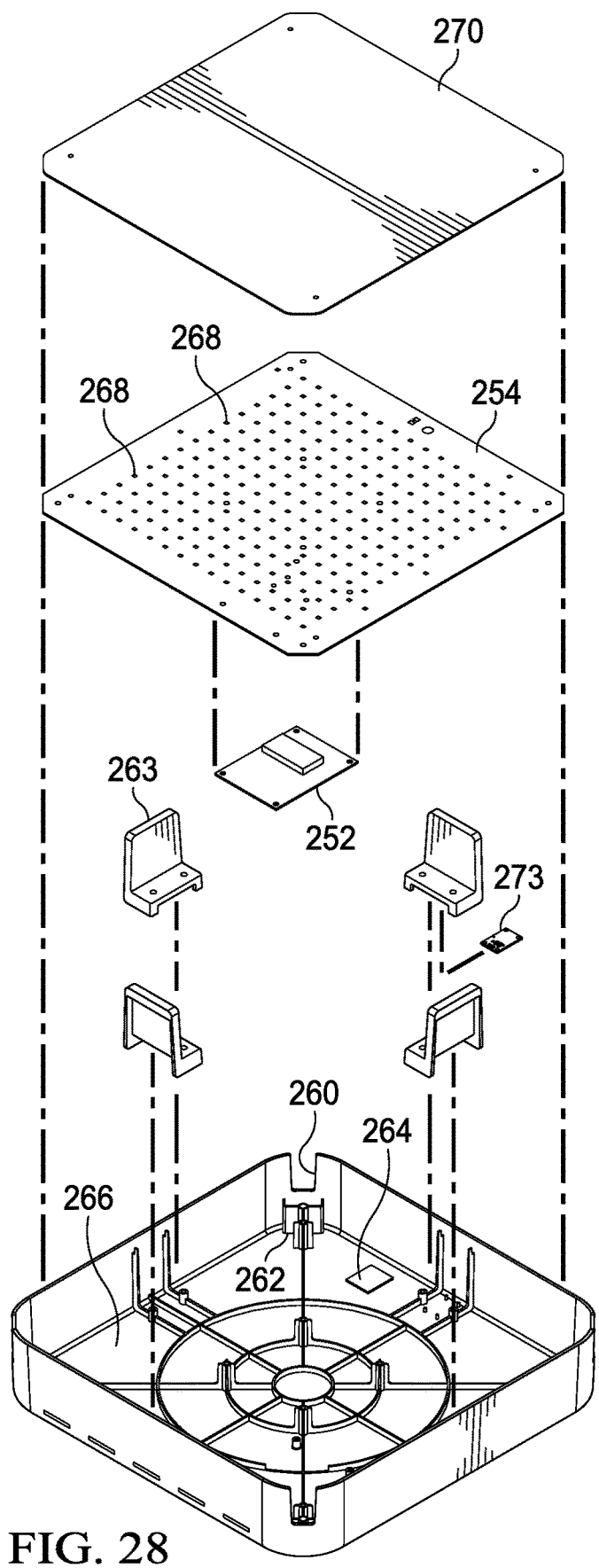
FIG. 28 is an exploded view of a lighting system of the hydroponic growing unit of FIG. 1.
Figure 29:
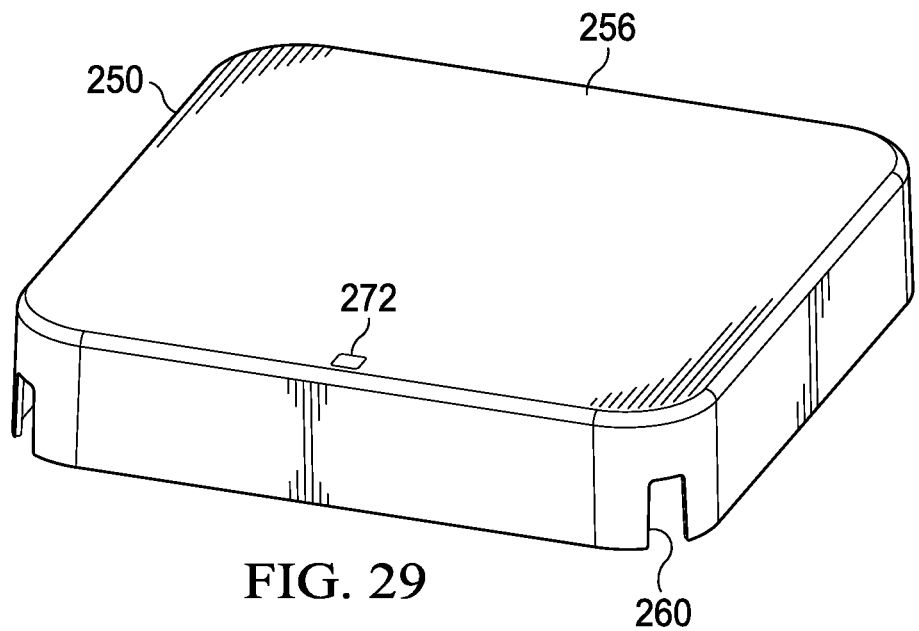
FIG. 29 is a perspective view of the lighting system of FIG. 28.
Figure 30:
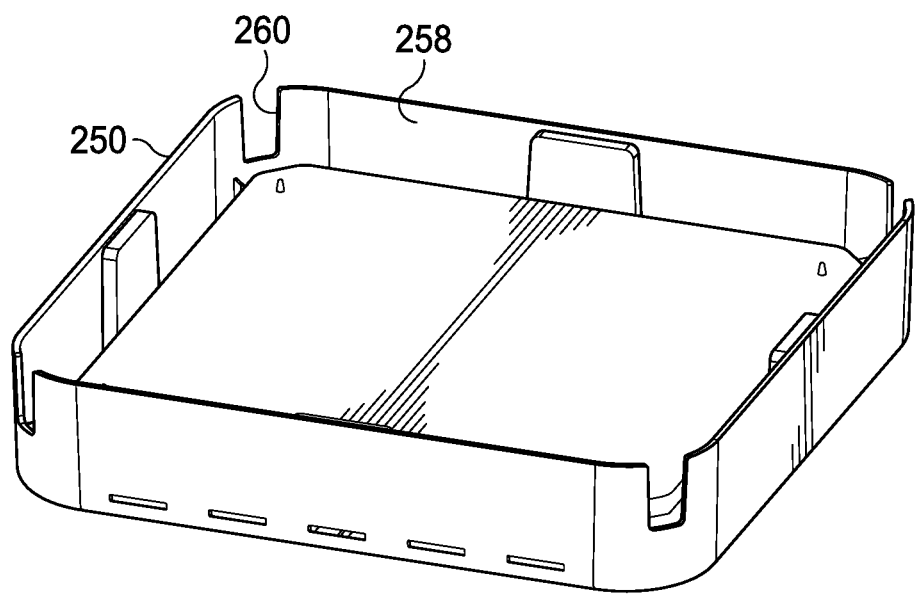
FIG. 30 is a perspective view of the underside of the lighting system of FIG. 28.

Referring to FIG. 1, a hydroponic growing unit 100 in accordance with an embodiment is illustrated. It should be appreciated that the drawings may be simplified and/or illustrative views of a unit, and the hydroponic growing unit 100 may include additional elements that are not depicted. The hydroponic growing unit 100 includes a growth unit 102 coupled to a support 104. The support 104 is coupled to a plurality of columns 106, which are in turn coupled to a lighting system 108. Each of these components are discussed further below.

With reference to the figures, the growth unit 102 includes a housing 110 configured to contain a water reservoir 112. A support structure or platform 114 may be removably coupled to the water reservoir 112. The water reservoir 112 includes notches 116 for receiving projections 118 of the platform 114. The platform 114 includes an upper surface 120 extending to the projections 118. The upper surface 120 is web-like and defines a plurality of apertures 122. In the illustrated embodiment, four circular apertures 122 are arranged in a grid pattern. For each of the apertures 122, the platform 114 includes a rim 124. The apertures 122 are sized to support net cups, such as 4-inch net cups 126, which include a frame 128 and a lip 130. The frame 128 passes through the aperture 122, while the rim 124 prevents the lip 130 from moving through the aperture 122. In other words, the lip 130 is supported by the rim 124 when a 4-inch net cup 126 is positioned on the platform 114. To support a 2-inch net cup 132, an adapter 134 may be used. The adapter 134 includes an outer ring 136 and an inner ring 138 being connected by an angled wall 140. The wall of the inner ring 138 ends in an inner skirt 142, which defines an opening 144. On the underside of the adapter 134 are a series of flanges 146, which provide stabilizing support when the adapter 134 is placed in the platform 114. When the adapter 134 is positioned in the platform 114, the outer ring 136 is supported by the rim 124, similar to the lip 130 of the 4-inch net cup 126. The 2-inch net cup 132 may then be placed in the adapter 134. The opening 144 of the adapter 134 allows a frame 148 of the 2-inch net cup 132 to pass through, while the inner ring 138 supports a lip 150 of the 2-inch net cup 132. Thus, a user may mix-and-match the desired sizes of net cups used in the hydroponic growing unit 100. The water reservoir 112 may include a fill line 152 to indicate to a user that the water level should not exceed that level. The fill line 152 is below, or at a lower level than, a bottom of the 4-inch net cup 126 would be when positioned on the platform 114. The water reservoir 112 has a volume large enough to hold at least 1 gallon, at least 2 gallons, or a volume of between 1 and 4 gallons, of water below the fill line. When a 4-inch net cup 126 is used, a liner 154 may be included. The liner 154 allows a plant potted in soil to be transferred to the 4-inch net cup 126. The liner 154 prevents soil from dropping into the water in the water reservoir 112. Soil or other particulate matter would foul the water and potentially clog the pump (described below). The roots of the plant would grow through the liner 154, allowing the plant to continue growing. The liner 154 may be made of, for example, coconut fiber. The liner 154 may include a coating such as, for example, a latex coating.

The growing unit 102 also includes a plurality of cover plates 156. Sidewalls 158 of each cover plate 156 are shaped so that, when the cover plates 156 are assembled, the sidewalls 158 define a plurality of openings 160. In the illustrated embodiment, the openings 160 and the apertures 122 are axially aligned. The openings 160 are configured to leave each of the apertures 122 of the platform 114 uncovered. Thus, the cover plates 156 do not prevent a user from placing a plant on the platform 114. The sidewalls 158 of each cover plate 156 also include indentations that allow the user to grip the cover plates 156 and position them on or remove them from the water reservoir 112. If the growing unit 102 is not used at maximum capacity, a lid 162 may be positioned in any unoccupied aperture 122. The lids 152, along with the cover plates 156, block light from the water reservoir 112 and help reduce the growth of algae therein.

A water circulating system 164 is configured to circulate water in the water reservoir 112 to the plants growing in the hydroponic growing unit 100. The water circulation system 164 includes a pump 166 coupled to a sprayer 168. The sprayer 168 is centrally positioned in the water reservoir 112. Being positioned central to the plants, rather than surrounding the plants, allows for less material (e.g., tubing, multiple nozzles) to be used. The sprayer 168 includes a multi-pronged nozzle 170 coupled to a pump tube 172. The multi-pronged nozzle 170 directs water towards each plant (i.e., toward the net cups 126, 132). To properly orient the multi-pronged nozzle 170, the underside 174 of the center cover plate 156a includes a guide 176. The guide 176 includes a series of channels 178. When the center cover plate 156a is positioned on the platform 114, the multi-pronged nozzle 170 orients itself to cause the prongs of the nozzle 170 to enter the channels 178. This prevents the multi-pronged nozzle 170 from directing water away from the plants. Thus, the growth unit 102 is configured to maintain a desired orientation of the multi-pronged nozzle 170. While the water is being circulated, the water is aerated by the air surrounding the net cups 126, 132. The pump tube 172 is removably coupled to the pump 166 via a pump adapter 180. A bottom surface 182 of the water reservoir 112 is sloped and includes a pump housing 184 near or at the bottom of the slope. The pump housing 184 includes a sidewall 186 in a shape and size sufficient for the pump 166 to be placed therein. The sidewall 186 includes an opening so that the inlet of the pump 166 remains unobstructed when the pump 166 is placed within the pump housing 184. The sidewall 186 may also include a channel 188 for a power cord to pass through. The pump housing 184 may also include a cover 189. The sloped configuration of the bottom surface 182 of the water reservoir 112 increases the time that the pump 166 is supplied with a sufficient amount of water if the water level in the reservoir 112 decreases. The inlet of the pump 166 may include a filter 190 to reduce the likelihood of particulate matter entering the pump or of buildup (e.g., mineral residue) occurring at the inlet.

The hydroponic growing unit 100 also includes a drainage tube 192 for draining water from the water reservoir 112, for example, to clean the water reservoir 112. The drainage tube 192 may be J-shaped, straight, or have any other curvature to it. The multi-pronged nozzle 170 and a pump tube 172 may be separated from the pump adapter 180, and one end of the drainage tube 192 is coupled to the pump adapter 180. The pump 166 may remain on or be turned off during this switch. The drainage tube 192 extends out of the water reservoir 112. The pump 166 is connected to a power source 218 via a pump power cord 194. To prevent roots from the plants from wrapping around the pump power cord 194, the water reservoir 112 includes a channel 196 extending from the pump 166 to the sidewall 198 of the water reservoir 112. The channel 196 includes raised walls 200. The channel 196 may also include baffles (not shown) that decrease the width of the channel 196 such that the pump power cord 194 must be squeezed into place. Thus, the pump power cord 194 resists unintentional movement out of the channel 196.

Referring to the figures, the water reservoir 112 includes a water level indicator 204. The water level indicator 204 comprises a magnetic float 206 and a housing 208. The housing 208 defines an interior 210 that is in communication with the interior of the water reservoir 112. When the water level rises or lowers in the water reservoir 112, the water level in the housing 208 correspondingly rises and lowers along with the magnetic float 206. A sensor, such as an electronic read switch, may be used to determine when the magnetic float 206 reaches a predetermined height. For example, the predetermined level may indicate that a certain volume (e.g., a gallon) of water remains in the water reservoir 112.

With reference to the figures, the housing 110 defines an interior 212 that includes a compartmentalized bottom surface 214. In the illustrated embodiment, the bottom surface 214 includes four triangular segments 216. The power source 218 is positioned in one of the triangular segments. If water enters the housing 110, for example from the water reservoir 112, the compartmentalization decreases the likelihood of the water reaching the power source 218. Additionally, the segment 216 containing the power source 218 is lower than the remaining segments 216. The housing 110 is removably coupled to the support 104. In an embodiment, a lower surface 220 of the housing 110 is configured to receive the support 104. As shown in the figures, for example, the lower surface 220 includes grooves 222. The grooves 222 are X-shaped, which corresponds to the X-shape of the support 104. Of note, the grooves 222 are used to compartmentalize the bottom surface 214 of the interior 212. When the housing 110 is coupled to the support 104, the lower surface 220 of the housing 110 does not extend past the support 104. The hydroponic growing unit 100 also includes a power switch 224 and a power cord 226. The power cord 226 may be connected to an electrical outlet, and the power switch 224 may toggle between an on position and an off position. In the off position, power to the pump 166 and lighting system 108 is stopped. In the on position, power is provided to the pump 166 and lighting system 108 from the power source 218.

In the illustrated embodiment, the power switch 224 is positioned on the lower surface 220 of the housing 110. The housing 110 includes at least a first and second outlet 228, 230. The power cord 226 extends from the power source 218 through the first outlet 228. Similarly, a lighting power cord 232 extends from the power source 218 through the second outlet 230 and into the support 104. At least a portion of the support 104 is hollow allowing the lighting power cord 232 to extend at least to an end 234 of the support 104, as shown in the figures. As discussed above, the support 104 is removably coupled to a plurality of columns 106. In the illustrated embodiment, each of the columns 106 includes a projection 236 that extends into hollow ends 234 of the support 104. Fasteners, such as screws 238 and washers 240 may be used to secure the columns 106 to the support 104. The column 106 adjacent to the end 234 of the support 104 containing the lighting power connector 225 includes a lighting power connector 242. The lighting power cord 232 and the lighting power connector 242 mate, and the lighting power connector 242 extends up through the column 106. Near or at the top of each column 106 is a shade support 244 to couple the columns 106 to the lighting system 108. The lighting power connector 242 extends at least from the projection 236 to the support 244. The columns 106 also include end caps 246 at the ends 248 of the columns 106. These end caps 246 may be removed, and multiple hydroponic units 100 may be stacked together.

With reference to the figures, the lighting system 108 includes a shade 250, a control board 252, and a lighting panel 254. The shade 250 includes a top surface 256 and a sidewall 258 extending therefrom. The sidewall 258 includes indentations 260, which mate with the shade supports 244 of the columns 106. The sidewall 258 acts to redirect light from the lighting panel 254 towards the plants below. This also allows a user to be at eye level with the lighting panel 254 without having light shine directly at them. The shade 250 also includes one or more brackets 262 or inserts 263. The brackets 262 and/or inserts 263 extend along at least a portion of the sidewall 258. The brackets 262 and/or inserts 263 increase the strength of the sidewall 258, which allows a user to more easily reposition the hydroponic growing unit 100 by gripping the shade 250. The shade 250 may also include or be coupled to a charging station 264. The charging station 264 may be, for example, conductive or inductive. The inductive charging station 264 may be directly or indirectly coupled to the control board 252 and/or the lighting power connector 242. The inductive charging station 264 would allow a user to charge a device, such as a mobile phone, on top of the shade 250. The hydroponic growing unit 100 may also include a charging outlet, such as a 120 V AC outlet.

Still referring to the figures, the control board 252 is coupled to an underside 266 of the shade 250. The control board 252 is electronically coupled to the lighting power connector 242. The control board 252 may include a wireless protocol, such as Bluetooth® or another wireless protocol, to communicate with a reader device, such as a mobile phone. The lighting panel 254 includes a series of lights 268, such as LEDs. The lights 268 may include one or more wavelength and color. The wattage of the lights may be, for example, 60 W. In an embodiment, the wavelength of the light from the lights 268 may be in a range of 400 nm to 700 nm. The lighting system 108 also includes a lens 270 between the lighting panel 254 and the growth unit 102 (i.e., the plants). The hydroponic growing unit 100 also includes a switch 272 for turning the lights 268 on and off. The switch 272 may also be used to dim the lights 268. In the illustrated embodiment, the switch 272 is on the top surface 256 of the shade 250 and a related sensor 273 is on the opposite side of the shade 250. The switch 272 may be, for example, a capacitive switch or a button. In embodiments where the switch 272 is capacitive, there is not opening in the top surface 256 for wiring to pass therethrough. This creates a more secure environment for the control board 252 and lighting panel 254 in case something is spilled on the shade 250. The border of the switch 272 may be raised from the top surface 256 to allow a user to easily determine where the switch 272 is.

The control board 252 may be programmed to turn the lights 268 on for a set period of time each day. In various embodiments, the daily light period may be in a range of 12 hours to 16 hours, or 14 hours. This removes the need for the user to actively turn on and off the lights, which improves the likelihood that the plants receive sufficient light each day. In an embodiment, the control board 252 may be programmed to turn the lights 268 back on after a set period of time after the switch 272 is activated (e.g., to dim or turn off the lights 268).

The lighting system 108 is fixed to the growth unit 106. In other words, the height between the lighting system 108 and the upper surface of the growth unit (e.g., a top surface 274 of the cover plates 156) is fixed. The height (H) from the lighting panel 254 to the top surface 274 of the cover plates 156 may be in a range of, for example, 14 to 18 inches. In an embodiment, the height (H) may be 16 inches. The lighting system 108, at the fixed height (H) is configured to provide sufficient light to seeds, seedlings, or plants positioned in the growth unit 102.

In various embodiments, the hydroponic growing unit 100 may be configured to indicate one or more conditions to a user. In an embodiment, when the sensor senses that the magnetic float 206 is at the predetermined level, an indicator notes that the water level is at a predetermined level. The indicator lets the user know that more water should be added to the water reservoir 112. In an embodiment, the indicator is the repeated flashing of the lights 268. For example, the lights 268 may repeatedly flash at a predetermined interval, such as every 10 seconds, until the user adds more water to cause the water level to rise above the predetermined level. This reduces the chances of the pump 166 running dry. The hydroponic growing unit 100, in an embodiment, may be configured to indicate that the pump 166 has stopped working. For example, the lights 268 may constantly flash until the pump is turned off or, if something is clogging the pump, until the pump is able to run again. Additionally, in an embodiment, an indicator may let the user know that the wireless protocol, such as Bluetooth®, has been activated. For example, the lights 268 may flash once to indicate that the Bluetooth® is now available for nearby devices to locate.

Various components of the hydroponic growing unit 100 may be made of, for example, metal or plastic. In various embodiments, the housing 110 and the shade 250 may be made of the same material. For example, the housing 110 and/or the shade 250 are made of acrylonitrile butadiene styrene resin. The material may include UV inhibitors to avoid discoloration of the material over time. In various embodiments, one or more components may be made of a reinforced material, such as glass-filled nylon, for increased strength. For example, the platform 114 may be made of glass-filled nylon.

Various plants may be grown in the hydroponic growing unit 100. Suitable plants include, without limitation, leafy plants, herbs, flowering plants.

In use, a seed, seedling, or plant may be placed in one of the 4-inch net cups 126 and/or the 2-inch net cups 132. As discussed above, a plant already rooted in a material, such as soil, may also be added to the hydroponic growing unit 100. A seed, before it has grown or at any stage of germination, may be positioned in growing media in the net cups 126, 132. A growing medium can include a sponge-like growing medium. Examples of a growing medium include, without limitation, coir (compressed, non-compressed, screened, coir dust, and/or coir pith), peat, peat moss (for example, sphagnum peat moss), peat humus, vermiculite, compost perlite, bark, bark fines, composted bark fines, wood shavings, saw dust, mulch, a modified cornstarch, corn stover, sunflower stem, composted rice hulls, reed sedge peat, composted manure, composted forest products, coffee grounds, composted paper fiber, digested manure fiber, composted tea leaves, bagasse, yard waste compost, cotton derivatives, wood ash, bark ash, vegetative by-products, agricultural by-products, or combinations thereof. In other embodiments, the rooting media may include fertilizers or fertilizing agents. These materials may also be formed and/or molded into a solid form. In an embodiment, the growing media is molded into a cone, acorn, triangular acorn, flower pot, or spike form. In another embodiment, the growing media is the Q-PLUG® or EXCEL-PLUG® manufactured and sold by International Horticultural Technologies, Inc. Hollister, Calif. 95024. In another embodiment, the Q-PLUG® or EXCEL-PLUG® is molded and shaped into a cone, acorn, triangular acorn, flower pot, or spike shape. In another embodiment, the molded and/or formed rooting media 172 is adapted to fully or partially fill the interior space defined by the net cups 126, 132. The components of the growing media may be derived from natural or organic sources. As such, plants or vegetables that are produced from the seed pods 100 may be classified and rated as organic. In the illustrated embodiment, the growing media 276 is a molded cylindrical plug sized to fit in the 2-inch net cup 132. Because the 2-inch net cup 132 is tapered, the cylindrical growing media 276 fits snugly in the 2-inch net cup 132. The 2-inch net cup 132 may bow slightly due to the presence of the growing media 276. When the 2-inch net cup 132 is not full, the sound of water splashing against the sides of the 2-inch net cup 132 may be noticeable. Because the growing media 276 fills the 2-inch net cup 132, this sound is significantly reduced. In an embodiment, the growing media 276 may have a diameter of 4.8 cm and a height of 5.2 cm.

To aid in successful growth of the plants in the hydroponic growing unit 100, nutrients may be added to the water in the water reservoir 112. In various embodiments, nutrient composition is added to the water periodically. The nutrient composition may be, for example, in powder or liquid form. The nutrient composition may be added, for example, every two weeks or once a month. U.S. Provisional Application No. 62/770,216, International Application No. PCT/US2019/062415, filed concurrently with this application, entitled "Nutrient Composition", is incorporated herein by reference in its entirety. Increasing the time between additions of the nutrient composition improves the ease of growing plants using the hydroponic growing unit 100. The nutrient solution may have a self-balancing pH. As the plant or plants grow in the hydroponic growing unit, the roots of the plants may reach the water residing in the water reservoir. The roots may grow down to the pump. The pump housing helps to protect the pump from the roots entering the pump and interfering with its operation and ability to intake water. As described above, the channel 196 helps to protect the pump power cord 194 from root interference. Once the roots have reached the water, it is still desirable to have the pump 166 to be powered on so that the water is still aerated. Without aeration, the survival time of the plants is limited. The water does not need to be replaced during the lifecycle of the plants growing therein.

The hydroponic growing unit 100 may act as a piece of furniture in a home. For example, the hydroponic growing unit 100 may be used as an end table. In various embodiments, a total height of the hydroponic growing unit 100 may be in a range from 26 inches to 30 inches, or may be 28 inches. The hydroponic growing unit 100 may come in a variety of external shapes. In the illustrated embodiment, the exterior of the hydroponic growing unit 100 is substantially square-shaped and has rounded edges. As described above, the hydroponic growing units according to one or more embodiments and/or methods may provide a method of growing seeds and/or plants by: automating the water, nutrients, and light provided each day; reducing the frequency that nutrients must be added; and not requiring the water to be changed during the lifecycle of the plants.

In certain illustrative embodiments, each of the components described herein are injection molded to a desired shape. In some embodiments, each component may be molded as a single, unitary molded part. In other embodiments, the component may be molded in multiple parts that are joined or attached together to form the component. The various means for designing molds, and joining various parts to form one component will be understood by one familiar with such processes and parts.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Accordingly, the various embodiments are not to be limited in scope by the specific embodiments described herein. Further, although some of the embodiments have been described herein in the context of a particular implementation in a particular environment for a particular purpose, those of ordinary skill in the art should recognize that its usefulness is not limited thereto and that the various embodiments can be beneficially implemented in any number of environments for any number of purposes. Accordingly, the claims set forth below should be construed in view of the full breadth and spirit of the embodiments as disclosed herein. While the foregoing description includes many details and specificities, it is to be understood that these have been included for purposes of explanation only, and are not to be interpreted as limitations of the various embodiments. Many modifications to the embodiments described above can be made without departing from the spirit and scope of this description.

What is claimed is:

1. A hydroponic growing apparatus, comprising:
   a housing having a compartmentalized bottom surface;
   a housing support, the housing being removably coupled to the housing support;
   a water reservoir positioned in the housing and comprising a bottom surface and an open top surface;
   a support structure configured to fit into the open top surface of the housing and defining a plurality of support structure openings;
   a cover plate configured to fit over the support structure in the open top surface of the housing, the cover plate comprising a plurality of cut-outs corresponding to the plurality of support structure openings;
   a pump positioned on the bottom surface of the water reservoir, the pump comprising an inlet and an outlet;
   a sprayer coupled to the outlet of the pump;
   a lighting system having a plurality of columns coupling the lighting system to the housing;
   a power source positioned in the compartmentalized bottom surface; and
   a power cord extending from the power source through the housing support, through one of the plurality of columns, and to the lighting system.

2. The hydroponic growing apparatus of claim 1, wherein a fixed distance between a lower surface of the lighting system and an upper surface of the cover plate is in a range of 14 to 18 inches.

3. The hydroponic growing apparatus of claim 1, wherein the lighting system includes a control board, a lens, and a lighting panel including lights.

4. The hydroponic growing apparatus of claim 1, wherein the hydroponic growing apparatus is configured to turn the lighting system on for a period of time each day, the period of time being in a range of 12 to 16 hours.

5. The hydroponic growing apparatus of claim 1, further comprising a pump power cord extending from the pump in the water reservoir to the power source in the housing.

6. The hydroponic growing apparatus of claim 5, wherein the bottom surface of the water reservoir comprises a channel including raised walls configured to receive the pump power cord.

7. The hydroponic growing apparatus of claim 1, wherein the plurality of cut-outs of the cover plate define a cover opening, the cover opening overlapping one of the plurality of support structure openings.

8. The hydroponic growing apparatus of claim 1, further comprising a water level indicator including a magnetic float.

9. The hydroponic growing apparatus of claim 1, further comprising a basket of a size and shape to fit into any of the plurality of support structure openings.

10. The hydroponic growing apparatus of claim 1, wherein the plurality of support structure openings is four support structure openings arranged in a grid.

11. The hydroponic growing apparatus of claim 1, wherein the sprayer comprises a nozzle below the support structure, the nozzle located centrally of the plurality of support structure openings.

12. The hydroponic growing apparatus of claim 1, further comprising a drain tube selectively connected to the outlet of the pump that is repositionable to convey water entering the inlet of the pump to a location external to the housing.

13. The hydroponic growing apparatus of claim 1, further comprising a cord extending from the pump, along the bottom surface of the water reservoir, to a point external to the housing, wherein the pump is electrically powered.

14. A kit comprising:
   the hydroponic growing apparatus of claim 1;
   one or more net cups of a first size;
   one or more net cups of a second size, the second size being different from the first size;
   one or more adapters; and
   one or more cylindrical plugs sized to fit in the one or more net cups of the second size.

15. A kit comprising the hydroponic growing apparatus of claim 1 and a nutrient composition.

\* \* \* \* \*